(12) United States Patent
Zhang et al.

(10) Patent No.: US 11,054,611 B2
(45) Date of Patent: Jul. 6, 2021

(54) OPTICAL IMAGING LENS ASSEMBLY

(71) Applicant: Zhejiang Sunny Optical Co., Ltd, Ningbo (CN)

(72) Inventors: Kaiyuan Zhang, Ningbo (CN); Bo Song, Ningbo (CN); Yabin Hu, Ningbo (CN)

(73) Assignee: Zhejiang Sunny Optical Co., Ltd, Zhejiang Province (CN)

( * ) Notice: Subject to any disclaimer, the term of this patent is extended or adjusted under 35 U.S.C. 154(b) by 169 days.

(21) Appl. No.: 16/226,872

(22) Filed: Dec. 20, 2018

(65) Prior Publication Data
US 2019/0121064 A1 Apr. 25, 2019

Related U.S. Application Data

(63) Continuation of application No. PCT/CN2018/080123, filed on Mar. 23, 2018.

(30) Foreign Application Priority Data

Aug. 17, 2017 (CN) .......................... 201710705074.9
Aug. 17, 2017 (CN) .......................... 201721029252.2

(51) Int. Cl.
*G02B 9/62* (2006.01)
*G02B 27/00* (2006.01)
(Continued)

(52) U.S. Cl.
CPC .................. *G02B 9/62* (2013.01); *G02B 7/04* (2013.01); *G02B 13/0045* (2013.01); *G02B 27/0025* (2013.01)

(58) Field of Classification Search
CPC .......... G02B 9/62; G02B 13/00; G02B 13/04; G02B 13/005; G02B 13/0045;
(Continued)

(56) References Cited

U.S. PATENT DOCUMENTS 8,514,499 B2 * 8/2013 Hsu .......................... G02B 9/62
359/713
9,563,038 B2 2/2017 Tsai et al.
(Continued)

FOREIGN PATENT DOCUMENTS

CN 102621667 A 8/2012
CN 106556919 A 4/2017
(Continued)

*Primary Examiner* — Jie Lei
(74) *Attorney, Agent, or Firm* — Sughrue Mion, PLLC

(57) ABSTRACT

The present disclosure discloses an optical imaging lens assembly including a first lens, a second lens, a third lens, a fourth lens, a fifth lens, and a sixth lens sequentially from an object side to an image side along an optical axis. Each of the first lens and the fifth lens has a positive refractive power. Each of the second lens, the third lens, and the fourth lens has a positive refractive power or a negative refractive power. An object-side surface of the first lens and an image-side surface of the fifth lens are convex surfaces. An image-side surface of the second lens, an object-side surface of the sixth lens, and an image-side surface of the sixth lens are concave surfaces. A total effective focal length f of the optical imaging lens assembly and an entrance pupil diameter EPD of the optical imaging lens assembly satisfy: f/EPD≤1.8.

18 Claims, 14 Drawing Sheets

(51) Int. Cl.
*G02B 7/04* (2021.01)
*G02B 13/00* (2006.01)

(58) Field of Classification Search
CPC .... G02B 13/18; G02B 27/00; G02B 27/0025; G02B 7/04; G02B 3/04
USPC ................. 359/713, 739, 756–760, 752, 682
See application file for complete search history.

(56) References Cited

U.S. PATENT DOCUMENTS

| | | |
|---|---|---|
| 2013/0033762 A1 | 2/2013 | Tsai et al. |
| 2013/0070346 A1 | 3/2013 | Hsu et al. |
| 2015/0085175 A1* | 3/2015 | Huang ..................... G02B 3/04 |
| | | 348/340 |
| 2015/0370038 A1* | 12/2015 | Sun ..................... G02B 13/005 |
| | | 359/757 |

FOREIGN PATENT DOCUMENTS

| | | |
|---|---|---|
| CN | 106646833 A | 5/2017 |
| CN | 107272161 A | 10/2017 |
| CN | 207020385 U | 2/2018 |

\* cited by examiner

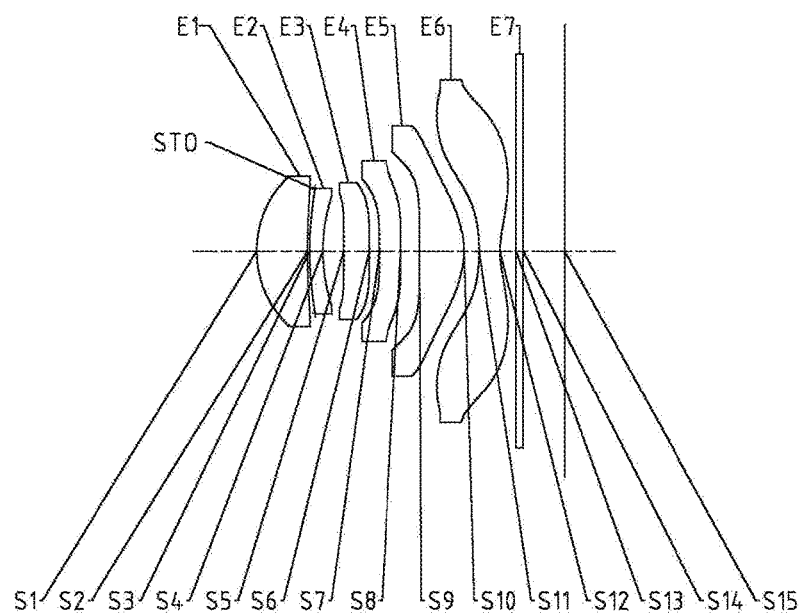
Fig. 5
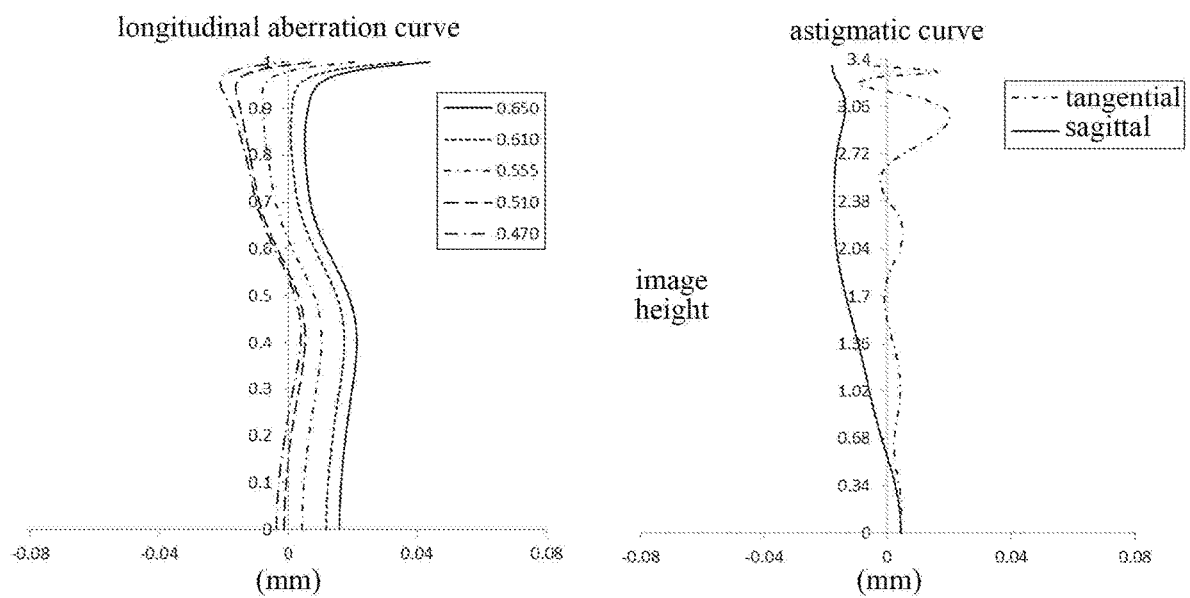
Fig. 6A
Fig. 6B

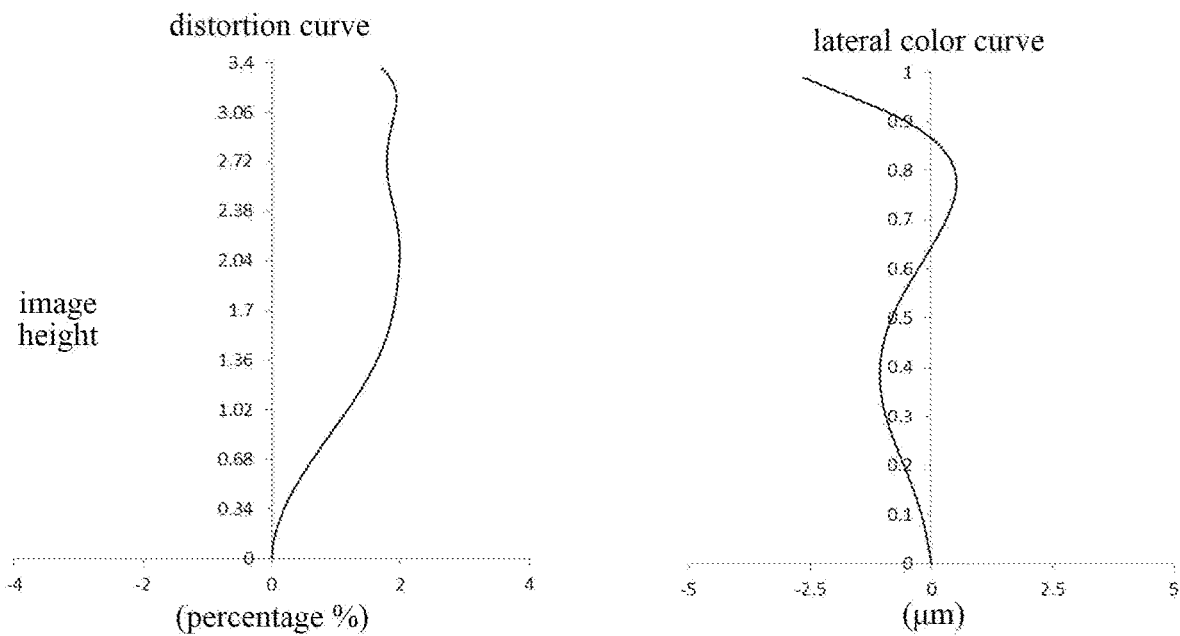
Fig. 10C
Fig. 10D
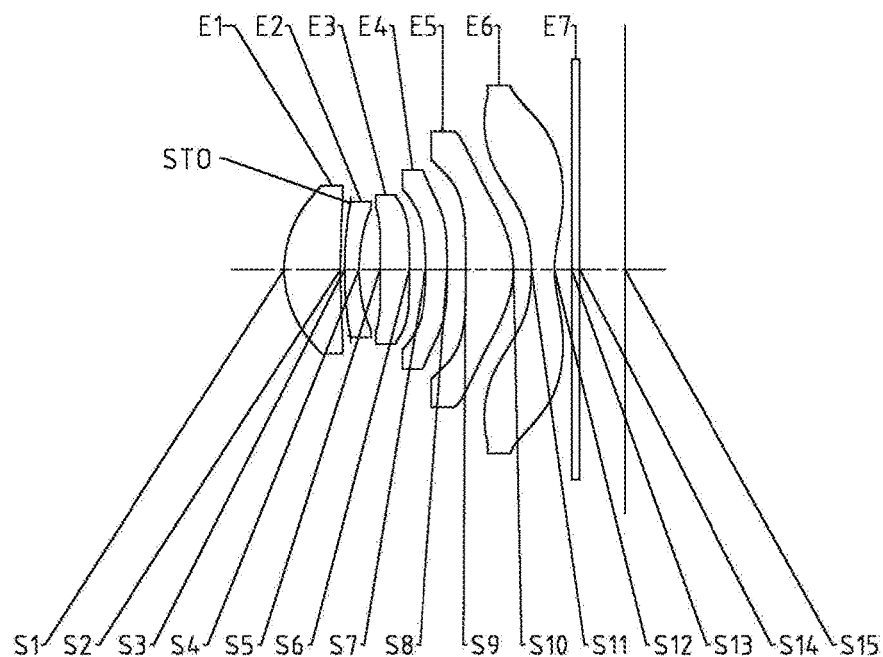
Fig. 11

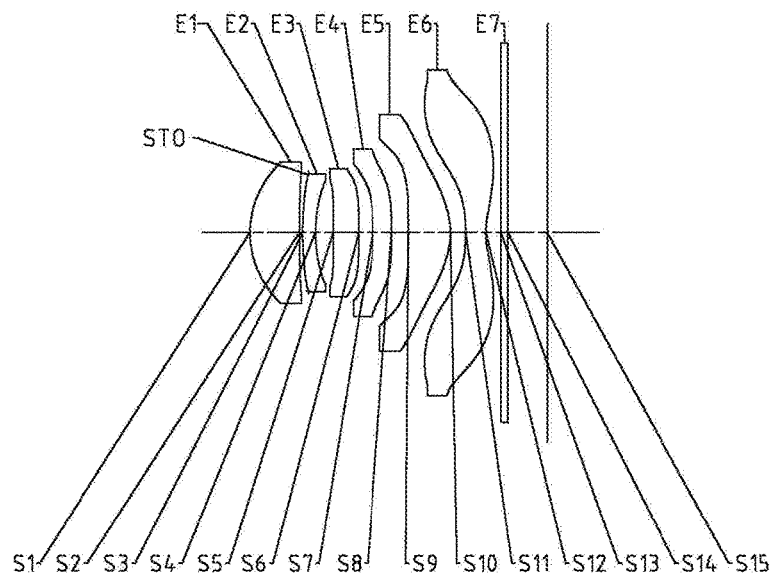
Fig. 13
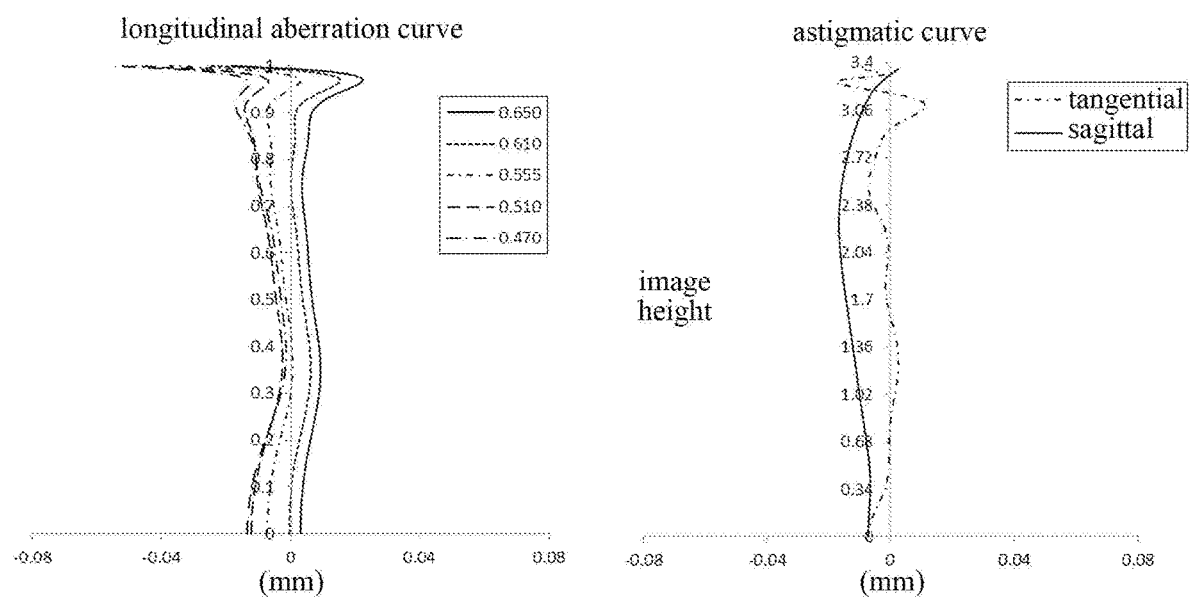
Fig. 14A
Fig. 14B

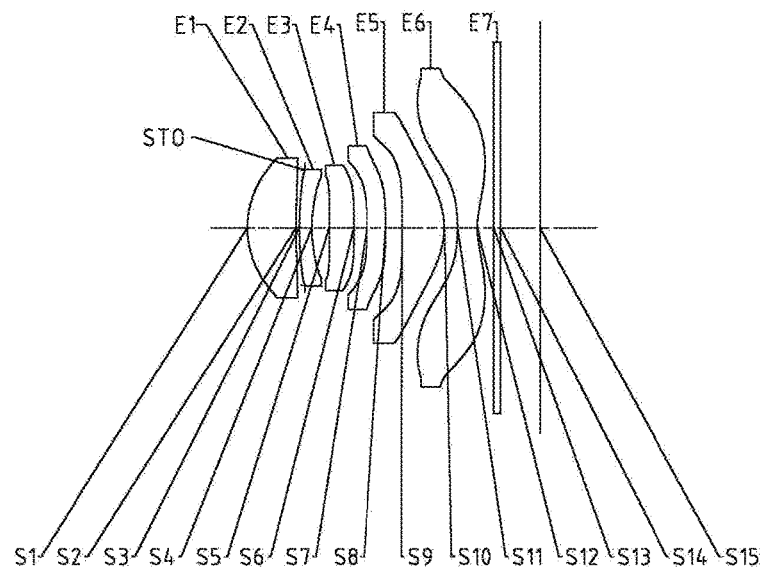
Fig. 17
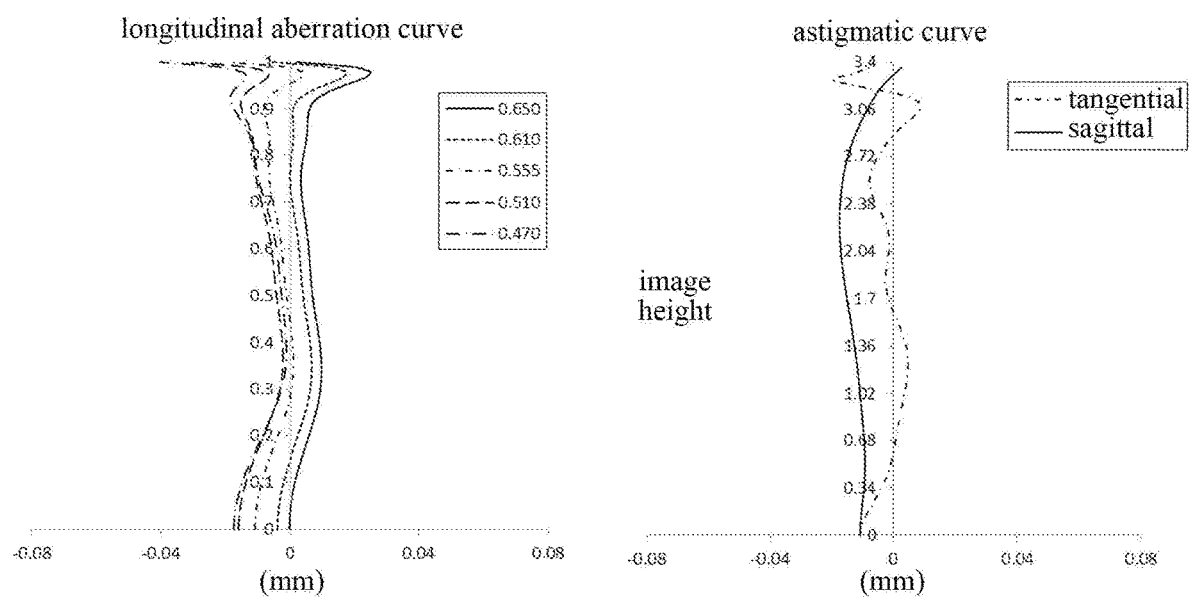
Fig. 18A                    Fig. 18B

OPTICAL IMAGING LENS ASSEMBLY

CROSS-REFERENCE TO RELATED APPLICATIONS

This is a continuation of International Application PCT/CN2018/080123, with an international filing date of Mar. 23, 2018, which claims the priorities and rights to Chinese Patent Application No. 201710705074.9 and Chinese Patent Application No. 201721029252.2 filed with the China National Intellectual Property Administration (CNIPA) on Aug. 17, 2017, the disclosures of which are hereby incorporated by reference in their entireties.

TECHNICAL FIELD

The present disclosure relates to an optical imaging lens assembly, and more specifically to an optical imaging lens assembly including six lenses.

BACKGROUND

With the development of science and technology, portable electronic products are gradually emerging, and portable electronic products having camera functions are increasingly favored by the consumers. Therefore, there is an increasing market demand for camera lens assemblies suitable for the portable electronic products. As the portable electronic products tend to be miniaturized, the total length of the lens assembly is limited, thereby increasing the difficulty in designing the lens assembly.

Meanwhile, with the improvement in performance and reduction in size of the commonly used photosensitive elements such as charge-coupled devices (CCD) or complementary metal-oxide semiconductor elements (CMOS), the number of pixels is increased and the size of the pixels is reduced. Accordingly, higher requirements on high imaging quality and miniaturization of the counterpart optical imaging lens assemblies have been brought forward.

The reduction in pixel size means that the amount of light passing through the lens may become smaller during the same exposure time. However, in the condition of a dim environment (e.g., cloudy and rainy days, or at dusk), the lens assembly needs to have a large amount of light passing through to ensure the imaging quality. A general configuration for an existing lens assembly includes an F-number Fno (total effective focal length of the lens assembly/entrance pupil diameter of the lens assembly) of 2.0 or above. Although this type of lens assembly can satisfy the miniaturization requirement, the imaging quality of the lens assembly cannot be ensured in a situation with insufficient light. Therefore, the lens assembly having the F-number Fno of 2.0 or above can no longer fulfill higher-order imaging requirements.

SUMMARY

The present disclosure provides an optical imaging lens assembly which may be applicable to portable electronic products and may at least or partially sovle at least one of the above disadvantages in the existing technology.

According to an aspect, the present disclosure provides an optical imaging lens assembly. The optical imaging lens assembly includes a first lens, a second lens, a third lens, a fourth lens, a fifth lens, and a sixth lens, sequentially from an object side to an image side along an optical axis. Each of the first lens and the fifth lens may have a positive refractive power. Each of the second lens, the third lens, and the fourth lens may have a positive refractive power or a negative refractive power. An object-side surface of the first lens and an image-side surface of the fifth lens may both be convex surfaces. An image-side surface of the second lens, an object-side surface of the sixth lens, and an image-side surface of the sixth lens may be concave surfaces. A total effective focal length f of the optical imaging lens assembly and an entrance pupil diameter EPD of the optical imaging lens assembly may satisfy: $f/EPD \leq 1.8$.

In an embodiment, an effective focal length f1 of the first lens and the total effective focal length f of the optical imaging lens assembly may satisfy: $0.7 < f1/f < 1$.

In an embodiment, the second lens may have a negative refractive power. An effective focal length f2 of the second lens and the total effective focal length f of the optical imaging lens assembly may satisfy: $-2.1 < f2/f - 1.7$.

In an embodiment, the third lens may have a positive refractive power. An effective focal length f3 of the third lens and a radius of curvature R6 of an image-side surface of the third lens may satisfy: $0 < f3/|R6| < 2$.

In an embodiment, the fourth lens may have a negative refractive power. An effective focal length f4 of the fourth lens and the total effective focal length f of the optical imaging lens assembly may satisfy: $-0.25 < f/f4 < 0$.

In an embodiment, an axial distance TTL from the object-side surface of the first lens to an image plane of the optical imaging lens assembly and half of a diagonal length ImgH of an effective pixel area on the image plane of the optical imaging lens assembly may satisfy: $TTL/ImgH \leq 1.5$.

In an embodiment, a spacing distance T12 between the first lens and the second lens on the optical axis may satisfy: $0\ mm < T12 < 0.2\ mm$.

In an embodiment, a center thickness CT5 of the fifth lens on the optical axis may satisfy: $0.6\ mm < CT5 < 0.8\ mm$.

In an embodiment, the axial distance TTL from the object-side surface of the first lens to the image plane of the optical imaging lens assembly may satisfy: $TTL < 4.8\ mm$.

In an embodiment, an image-side surface of the first lens may be a concave surface. The total effective focal length f of the optical imaging lens assembly and a radius of curvature R2 of the image-side surface of the first lens may satisfy: $0.2 < f/R2 < 0.7$.

In an embodiment, a radius of curvature R5 of an object-side surface of the third lens and a radius of curvature R6 of an image-side surface of the third lens may satisfy: $-1.1 < (R6+R5)/(R6-R5) < 3$.

In an embodiment, a radius of curvature R9 of an object-side surface of the fifth lens and a radius of curvature R10 of the image-side surface of the fifth lens may satisfy: $-1.5 < (R10+R9)/(R10-R9) < 0$.

In an embodiment, a radius of curvature R11 of the object-side surface of the sixth lens and a radius of curvature R12 of the image-side surface of the sixth lens may satisfy: $-1 < R12/R11 \leq -0.4$.

According to another aspect, the present disclosure provides an optical imaging lens assembly. The optical imaging lens assembly includes a first lens, a second lens, a third lens, a fourth lens, a fifth lens, and a sixth lens, sequentially from an object side to an image side along an optical axis. The first lens may have a positive refractive power, and an object-side surface of the first lens may be a convex surface. The second lens may have a negative refractive power, and an image-side surface of the second lens may be a concave surface. The third lens may have a positive refractive power. The fourth lens may have a negative refractive power. The fifth lens may have a positive refractive power, and at least one of an object-side surface of the fifth lens or an image-side surface of the fifth lens may be a convex surface. The sixth lens may have a negative refractive power, and an object-side surface and an image-side surface of the sixth lens may both be concave surfaces. An effective focal length f2 of the second lens and a total effective focal length f of the optical imaging lens assembly may satisfy: $-2.1<f2/f<-1.7$.

In an embodiment, the total effective focal length f of the optical imaging lens assembly and an entrance pupil diameter EPD of the optical imaging lens assembly may satisfy: $f/EPD \leq 1.8$.

In an embodiment, an effective focal length f1 of the first lens and the total effective focal length f of the optical imaging lens assembly may satisfy: $0.7<f1/f<1$.

In an embodiment, an image-side surface of the first lens may be a concave surface. The total effective focal length f of the optical imaging lens assembly and a radius of curvature R2 of the image-side surface of the first lens may satisfy: $0.2<f/R2<0.7$.

In an embodiment, a spacing distance T12 between the first lens and the second lens on the optical axis may satisfy: $0 \text{ mm}<T12<0.2 \text{ mm}$.

In an embodiment, an effective focal length f3 of the third lens and a radius of curvature R6 of an image-side surface of the third lens may satisfy: $0<f3/|R6|<2$.

In an embodiment, a radius of curvature R5 of an object-side surface of the third lens and a radius of curvature R6 of an image-side surface of the third lens may satisfy: $-1.1<(R6+R5)/(R6-R5)<3$.

In an embodiment, an effective focal length f4 of the fourth lens and the total effective focal length f of the optical imaging lens assembly may satisfy: $-0.25<f/f4<0$.

In an embodiment, a center thickness CT5 of the fifth lens on the optical axis may satisfy: $0.6 \text{ mm}<CT5<0.8 \text{ mm}$.

In an embodiment, a radius of curvature R9 of the object-side surface of the fifth lens and a radius of curvature R10 of the image-side surface of the fifth lens may satisfy: $-1.5<(R10+R9)/(R10-R9)<0$.

In an embodiment, a radius of curvature R11 of the object-side surface of the sixth lens and a radius of curvature R12 of the image-side surface of the sixth lens may satisfy: $-1<R12/R11 \leq -0.4$.

In an embodiment, an axial distance TTL from the object-side surface of the first lens to an image plane of the optical imaging lens assembly may satisfy: $TTL<4.8 \text{ mm}$.

In an embodiment, the axial distance TTL from the object-side surface of the first lens to the image plane of the optical imaging lens assembly and half of a diagonal length ImgH of an effective pixel area on the image plane of the optical imaging lens assembly may satisfy: $TTL/ImgH \leq 1.5$.

According to another aspect, the present disclosure provides an optical imaging lens assembly. The optical imaging lens assembly includes, sequentially from an object side to an image side along an optical axis, a first lens having a positive refractive power and a convex object-side surface; a second lens having a negative refractive power and a concave image-side surface; a third lens having a refractive power; a fourth lens having a refractive power; a fifth lens having a positive refractive power and a convex image-side surface; and a sixth lens having a negative refractive power, a concave object-side surface and a concave image-side surface. A center thickness CT5 of the fifth lens on the optical axis may satisfy: $0.6 \text{ mm}<CT5<0.8 \text{ mm}$.

The present disclosure adopts a plurality of lenses (e.g., six lenses). By reasonably distributing the refractive powers and the surface types of the lenses, the center thicknesses of the lenses, the spacing distances between the lenses on the optical axis, etc., during the process of increasing the amount of light passing through, the system has the advantage of large aperture, thereby enhancing the imaging effect in a dim environment while improving the aberration of the edge ray. At the same time, the optical imaging lens assembly with the above configuration may have at least one of the beneficial effects such as ultra-thin, miniaturization, large aperture, low sensitivity, small amount of distortion, and high imaging quality.

BRIEF DESCRIPTION OF THE DRAWINGS

By describing non-limiting embodiments below in detail and in combination with the accompanying drawings, other features, objectives and advantages of the present disclosure will be more apparent. In the accompanying drawings:

FIG. 5 is a schematic structural diagram illustrating an optical imaging lens assembly according to Embodiment 3 of the present disclosure;

FIGS. 6A-6D respectively illustrate a longitudinal aberration curve, an astigmatic curve, a distortion curve, and a lateral color curve of the optical imaging lens assembly according to Embodiment 3;

FIGS. 10A-10D respectively illustrate a longitudinal aberration curve, an astigmatic curve, a distortion curve, and a lateral color curve of the optical imaging lens assembly according to Embodiment 5;

FIG. 11 is a schematic structural diagram illustrating an optical imaging lens assembly according to Embodiment 6 of the present disclosure;

FIG. 13 is a schematic structural diagram illustrating an optical imaging lens assembly according to Embodiment 7 of the present disclosure;

FIGS. 14A-14D respectively illustrate a longitudinal aberration curve, an astigmatic curve, a distortion curve, and a lateral color curve of the optical imaging lens assembly according to Embodiment 7;

FIG. 17 is a schematic structural diagram illustrating an optical imaging lens assembly according to Embodiment 9 of the present disclosure; and FIGS. 18A-18D respectively illustrate a longitudinal aberration curve, an astigmatic curve, a distortion curve, and a lateral color curve of the optical imaging lens assembly according to Embodiment 9.

DETAILED DESCRIPTION

Figure 1:
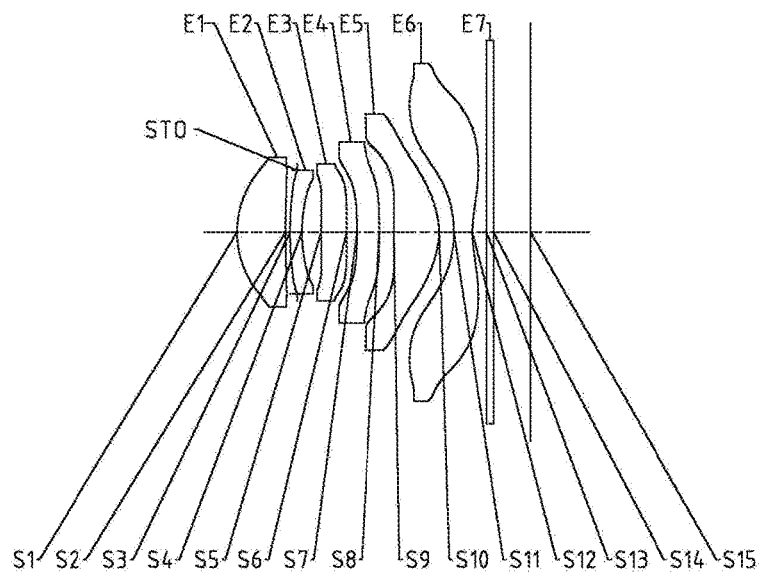
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary embodiments of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary embodiments of the present disclosure includes, for example, six lenses (i.e., a first lens, a second lens, a third lens, a fourth lens, a fifth lens, and a sixth lens) having refractive powers. The six lenses are arranged in sequence from an object side to an image side along an optical axis.

The first lens may have a positive refractive power. An effective focal length f1 of the first lens and a total effective focal length f of the optical imaging lens assembly may satisfy: $0.7 < f1/f < 1$, and more specifically, f1 and f may further satisfy: $0.79 \leq f1/f \leq 0.90$. By controlling the positive refractive power of the first lens within a reasonable range, the first lens can assume the positive refractive power required by the system, and the spherical aberration contributed by the first lens is within a reasonable and controllable range. Accordingly, the subsequent optical lenses may be ensured to reasonably correct the negative spherical aberration contributed by the first positive lens, and thus, the imaging quality of the system in the on-axis field-of-view may be better ensured.

An object-side surface of the first lens may be a convex surface, and an image-side surface of the first lens may be a concave surface. The total effective focal length f of the optical imaging lens assembly and a radius of curvature R2 of the image-side surface of the first lens may satisfy: $0.2 < f/R2 < 0.7$, and more specifically, f and R2 may further satisfy: $0.22 \leq f/R2 \leq 0.62$. By controlling the radius of curvature R2 of the image-side surface of the first lens, the fifth-order spherical aberration contribution of the image-side surface of the first lens can be controlled to a certain extent, to balance the fifth-order spherical aberration generated by the object-side surface of the first lens. Thus, the fifth-order spherical aberration of the first lens is controlled within a reasonable range.

The second lens has a positive refractive power or a negative refractive power. Alternatively, the second lens may have a negative refractive power. The effective focal length f2 of the second lens and the total effective focal length f of the optical imaging lens assembly may satisfy: $-2.1 < f2/f < -1.7$, and more specifically, f2 and f may further satisfy: $-2.06 \leq f2/f \leq -1.76$. By reasonably controlling the negative refractive power of the second lens, the positive spherical aberration generated by the second lens can be effectively constrained within a reasonable range, so that the positive spherical aberration generated by the second negative lens and the negative spherical aberration generated by the first positive lens are quickly counterbalanced, which makes the on-axis field-of-view and the nearby field-of-view have a good imaging quality.

An object-side surface of the second lens may be a convex surface, and an image-side surface of the second lens may be a concave surface.

The third lens has a positive refractive power or a negative refractive power. Alternatively, the third lens may have a positive refractive power. An effective focal length f3 of the third lens and a radius of curvature R6 of an image-side surface of the third lens may satisfy: $0<f3/|R6|<2$, and more specifically, f3 and R6 may further satisfy: $0.32 \leq f3/|R6| \leq 1.88$. By controlling the radius of curvature R6 of the image-side surface of the third lens within a reasonable range, the amount of the third-order astigmatism of the third lens can be controlled within a reasonable range, and thus, the amount of the astigmatism generated by the optical lenses at the front end (i.e., the lenses between the object side and the third lens) and the amount of the astigmatism generated by the optical lenses at the back end (i.e., the lenses between the third lens and the image side) can be balanced, so that the system has a good imaging quality.

A radius of curvature R5 of an object-side surface of the third lens and the radius of curvature R6 of the image-side surface of the third lens may satisfy: $-1.1<(R6+R5)/(R6-R5)<3$, and more specifically, R5 and R6 may further satisfy: $-1.05 \leq (R6+R5)/(R6-R5) \leq 2.74$. By reasonably controlling the radius of curvature of the object-side surface of the third lens and the radius of curvature of the image-side surface of the third lens, the spherical aberration of the system may be improved, thereby improving the imaging quality.

The fourth lens has a positive refractive power or a negative refractive power. Alternatively, the fourth lens may have a negative refractive power. An effective focal length f4 of the fourth lens and the total effective focal length f of the optical imaging lens assembly may satisfy: $-0.25<f/f4<0$, and more specifically, f4 and f may further satisfy: $-0.19 \leq f/f4 \leq -0.01$. By properly selecting the refractive power, the system has a good imaging quality and a low sensitivity. Thus, the injection molding of the system becomes easy, and the system may be assembled with a high yield.

The fifth lens may have a positive refractive power, and an image-side surface of the fifth lens may be a convex surface. A radius of curvature R9 of an object-side surface of the fifth lens and a radius of curvature R10 of the image-side surface of the fifth lens may satisfy: $-1.5<(R10+R9)/(R10-R9)<0$, and more specifically, R9 and R10 may further satisfy: $-1.00 \leq (R10+R9)/(R10-R9) \leq -0.85$. By reasonably controlling the radius of curvature of the object-side surface of the fifth lens and the radius of curvature of the image-side surface of the fifth lens, the incident angle of the chief ray of each field-of-view of the system onto an image plane can be reasonably controlled, thereby fulfilling the requirements of the optical system in designing the CRA (chief ray angle).

A center thickness CT5 of the fifth lens on the optical axis satisfies: $0.6 \text{ mm}<CT5<0.8 \text{ mm}$, and more specifically, CT5 may further satisfy: $0.66 \text{ mm} \leq CT5 \leq 0.72 \text{ mm}$. By reasonably controlling the center thickness of the fifth lens, the amount of the distortion of the system can be reasonably adjusted and controlled, so that the final distortion of the system after being balanced is within a reasonable range.

The sixth lens may have a negative refractive power. An object-side surface of the sixth lens may be a concave surface, and an image-side surface of the sixth lens may be a concave surface. A radius of curvature R11 of the object-side surface of the sixth lens and a radius of curvature R12 of the image-side surface of the sixth lens may satisfy: $-1<R12/R11 \leq -0.4$, and more specifically, R11 and R12 may further satisfy: $-0.96 \leq R12/R11 \leq -0.41$. By controlling the radius of curvature R12 of the image-side surface of the sixth lens, the projection height of the light on the image-side surface of the sixth lens can be adjusted and controlled, and thus the aperture of the image-side surface of the sixth lens is controlled.

The structural feasibility of the system may be ensured by adjusting the spacing distances between the lenses on the optical axis. For example, the spacing distance T12 between the first lens and the second lens on the optical axis may satisfy: $0 \text{ mm}<T12<0.2 \text{ mm}$, and more specifically, T12 may further satisfy: $0.03 \text{ mm} \leq T12 \leq 0.17 \text{ mm}$.

A total track length TTL of the optical imaging lens assembly (i.e., a distance on the axis from the center of the object-side surface of the first lens to the image plane of the optical imaging lens assembly) may satisfy: $TTL<4.8 \text{ mm}$, and more specifically, TTL may further satisfy: $4.69 \text{ mm} \leq TTL \leq 4.72 \text{ mm}$. When the conditional expression $TTL<4.8 \text{ mm}$ is satisfied, it reflects the ultra-thin characteristic of the lens assembly.

The total track length TTL of the optical imaging lens assembly and half of a diagonal length ImgH of an effective pixel area on the image plane of the optical imaging lens assembly may satisfy: $TTL/ImgH \leq 1.5$, and more specifically, TTL and ImgH may further satisfy: $1.39 \leq TTL/ImgH \leq 1.40$. By controlling the ratio of the total track length to the image height of the lens assembly, the overall size of the imaging lens assembly may be effectively compressed, to achieve the ultra-thin characteristic and the miniaturization of the optical imaging lens assembly. Accordingly, the optical imaging lens assembly can be better suitable for a size-limited system such as a portable electronic product.

The total effective focal length f of the optical imaging lens assembly and an entrance pupil diameter EPD of the optical imaging lens assembly may satisfy: $f/EPD \leq 1.8$, and more specifically, f and EPD may further satisfy: $1.69 \leq f/EPD \leq 1.80$. The smaller the F-number Fno of the optical imaging lens assembly (i.e., the total effective focal length f of the lens assembly/the entrance pupil diameter EPD of the lens assembly) is, the larger the clear aperture of the lens assembly is, and the greater the amount of light entering the lens assembly in the same unit time is. The reduction of the F-number Fno may effectively enhance the brightness on the image plane, so that the lens assembly can better fulfill the shooting requirements when the light is insufficient. When the lens assembly is configured to satisfy the conditional expression $f/EPD \leq 1.8$, the lens assembly may have the advantage of large aperture during the process of increasing the amount of light passing through, thereby enhancing the imaging effect in the dim environment while improving the aberration of the edge ray. At the same time, it is also conductive to improving the high-order comatic aberration and the astigmatism of the imaging system, thereby improving the imaging quality of the lens assembly.

In the exemplary embodiments, the optical imaging lens assembly may also be provided with at least one diaphragm, to further enhance the imaging quality of the lens assembly. Alternatively, the diaphragm may be disposed between the first lens and the second lens. It should be understood by those skilled in the art that the diaphragm may be disposed at any position between the object side and the image side as needed. That is, the arrangement of the diaphragm should not be limited to the position between the first lens and the second lens.

Alternatively, the optical imaging lens assembly may further include an optical filter for correcting color deviations and/or a protective glass for protecting a photosensitive element on the image plane.

The optical imaging lens assembly according to the above embodiments of the present disclosure may use a plurality of lenses, for example, the six lenses described above. By reasonably distributing the refractive powers and optimally selecting parameters of the high-order aspheric surfaces, an optical imaging lens assembly which is applicable to portable electronic products and has a large ultra-thin aperture and a good imaging quality is proposed.

In the embodiments of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having six lenses is described as an example in the embodiments, the optical imaging lens assembly is not limited to include six lenses. If desired, the optical imaging lens assembly may also include other numbers of lenses.

Specific embodiments of the optical imaging lens assembly that may be applied to the above embodiments are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 1 shows the surface type, the radius of curvature, the thickness, the material and the conic coefficient of each lens of the optical imaging lens assembly in Embodiment 1. The radius of curvature and the thickness are both in millimeters (mm).

TABLE 1

| | | | | material | | |
| --- | --- | --- | --- | --- | --- | --- |
| surface number | surface type | radius of curvature | thickness | refractive index | abbe number | conic coefficient |
| OBJ | spherical | infinite | infinite | | | |
| S1 | aspheric | 1.5439 | 0.7487 | 1.55 | 56.1 | −0.0240 |
| S2 | aspheric | 6.4020 | 0.1597 | | | −26.6376 |
| STO | spherical | infinite | 0.0087 | | | 0.0000 |
| S3 | aspheric | 7.4371 | 0.2000 | 1.67 | 20.4 | −1.4654 |
| S4 | aspheric | 3.0602 | 0.2080 | | | −0.2892 |
| S5 | aspheric | 6.9408 | 0.3859 | 1.55 | 56.1 | −44.1015 |
| S6 | aspheric | 14.9115 | 0.2049 | | | −44.5126 |

TABLE 1-continued

| surface number | surface type | radius of curvature | thickness | material refractive index | abbe number | conic coefficient |
|---|---|---|---|---|---|---|
| S7 | aspheric | 21.0264 | 0.3000 | 1.67 | 20.4 | 71.0486 |
| S8 | aspheric | 18.7645 | 0.2864 | | | −81.9119 |
| S9 | aspheric | −1476.2918 | 0.6550 | 1.55 | 56.1 | −99.0000 |
| S10 | aspheric | −1.2629 | 0.2127 | | | −4.7161 |
| S11 | aspheric | −2.8586 | 0.3250 | 1.54 | 55.7 | −3.7340 |
| S12 | aspheric | 1.5748 | 0.5504 | | | −10.1271 |
| S13 | spherical | infinite | 0.1101 | 1.52 | 64.2 | |
| S14 | spherical | infinite | 0.3345 | | | |
| S15 | spherical | infinite | | | | |

As may be obtained from Table 1, the radius of curvature R5 of the object-side surface S5 of the third lens E3 and the radius of curvature R6 of the image-side surface S6 of the third lens E3 satisfy: (R6+R5)/(R6−R5)=2.74. The radius of curvature R9 of the object-side surface S9 of the lens E5 and the radius of curvature R10 of the image-side surface S10 of the fifth lens E5 satisfy: (R10+R9)/(R10−R9)=−1.00. The radius of curvature R11 of the object-side surface S11 of the sixth lens E6 and the radius of curvature R12 of the image-side surface S12 of the sixth lens E6 satisfy: R12/R11=−0.55. The spacing distance T12 between the first lens E1 and the second lens E2 on the optical axis satisfies: T12=0.17 mm. The center thickness CT5 of the fifth lens of E5 on the optical axis satisfies: CT5=0.66 mm.

In this embodiment, each lens may be an aspheric lens. The surface type x of each aspheric surface is defined by the following formula:

$$x = \frac{ch^2}{1+\sqrt{1-(k+1)c^2h^2}} + \sum A_i h^i. \quad (1)$$

Here, x is the sag—the axis-component of the displacement, of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S12 in Embodiment 1.

TABLE 2

| surface number | A4 | A6 | A8 | A10 | A12 |
|---|---|---|---|---|---|
| S1 | −6.2018E−03 | 3.1471E−02 | −1.5064E−01 | 4.4709E−01 | −8.2602E−01 |
| S2 | −2.9334E−02 | 6.4432E−02 | −1.7114E−01 | 5.1874E−01 | −1.1276E+00 |
| S3 | −1.1437E−01 | 2.2287E−01 | 2.2559E−01 | −2.4271E+00 | 7.9746E+00 |
| S4 | −9.3994E−02 | 3.0128E−01 | −3.5998E−01 | 7.8865E−01 | −2.3724E+00 |
| S5 | −1.2251E−01 | 5.8183E−01 | −4.2678E+00 | 1.9749E+01 | −5.7543E+01 |
| S6 | −7.7339E−02 | −2.6028E−01 | 1.9124E+00 | −7.3594E+00 | 1.6574E+01 |
| S7 | −1.5343E−01 | −4.3882E−01 | 4.4579E−01 | −1.1486E+00 | 1.6051E+00 |
| S8 | −1.3571E−01 | −6.9713E−02 | 2.8767E−01 | −4.0750E−01 | 2.4270E−01 |
| S9 | −9.4242E−03 | −5.5480E−02 | −1.4816E−01 | 4.3966E−01 | −5.7599E−01 |
| S10 | 9.8297E−02 | −2.4382E−01 | 2.1446E−01 | −1.1198E−01 | 4.5067E−02 |
| S11 | −2.8738E−02 | −2.2152E−01 | 2.5401E−01 | −1.2494E−01 | 3.5091E−02 |
| S12 | −1.3438E−01 | 6.9307E−02 | −2.6737E−02 | 6.8597E−03 | −1.0231E−03 |

| surface number | A14 | A16 | A18 | A20 |
|---|---|---|---|---|
| S1 | 9.5158E−01 | −6.6710E−01 | 2.6011E−01 | −4.3453E−02 |
| S2 | 1.5356E+00 | −1.2652E+00 | 5.7491E−01 | −1.1081E−01 |
| S3 | −1.5280E+01 | 1.7534E+01 | −1.1085E+01 | 2.9603E+00 |
| S4 | 5.1571E+00 | −6.6205E+00 | 4.6506E+00 | −1.3670E+00 |
| S5 | 1.0489E+02 | −1.1592E+02 | 7.0871E+01 | −1.8322E+01 |
| S6 | −2.2989E+01 | 1.9319E+01 | −9.0487E+00 | 1.8188E+00 |
| S7 | −1.4369E+00 | 8.7180E−01 | −3.7411E−01 | 8.0400E−02 |
| S8 | 3.7525E−02 | −1.2086E−01 | 5.5242E−02 | −8.3144E−03 |
| S9 | 4.3091E−01 | −1.8753E−01 | 4.4092E−02 | −4.3174E−03 |
| S10 | −1.4592E−02 | 3.2933E−03 | −4.2858E−04 | 2.3646E−05 |
| S11 | −6.0510E−03 | 6.3678E−04 | −3.7689E−05 | 9.6466E−07 |
| S12 | 3.0431E−05 | 1.6302E−05 | −2.4643E−06 | 1.1007E−07 |

Table 3 shows the effective focal lengths f1-f6 of the lenses in Embodiment 1, the total effective focal length f of the optical imaging lens assembly, the total track length TTL (i.e., the distance from the center of the object-side surface S1 of the first lens E1 to the image plane S15 on the optical axis) of the optical imaging lens assembly, and the half of the diagonal length ImgH of the effective pixel area on the image plane S15 of the optical imaging lens assembly.

TABLE 3

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.53 | −7.96 | 23.38 | −276.69 | 2.31 | −1.84 | 3.95 | 4.69 | 3.38 |

As may be obtained from Table 3, the effective focal length f1 of the first lens E1 and the total effective focal length f of the optical imaging lens assembly satisfy: f1/f=0.90. The effective focal length f2 of the second lens E2 and the total effective focal length f of the optical imaging lens assembly satisfy: f2/f=−2.02. The total effective focal length f of the optical imaging lens assembly and the effective focal length f4 of the fourth lens E4 satisfy: f4/f=0.01. The total track length of the optical imaging lens assembly satisfies: TTL=4.69 mm. The total track length TTL of the optical imaging lens assembly and the half of the diagonal length ImgH of the effective pixel area on the image plane S15 of the optical imaging lens assembly satisfy: TTL/ImgH=1.39.

As can be obtained from Tables 1 and 3, the total effective focal length f of the optical imaging lens assembly and the radius of curvature R2 of the image-side surface S2 of the first lens E1 satisfy: f/R2=0.62. The effective focal length f3 of the third lens E3 and the radius of curvature R6 of the image-side surface S6 of the third lens E3 satisfy: f3/|R6|=1.57.

In Embodiment 1, the total effective focal length f of the optical imaging lens assembly and the entrance pupil diameter EPD of the optical imaging lens assembly satisfy: f/EPD=1.79.

Figures 2A, 2B:
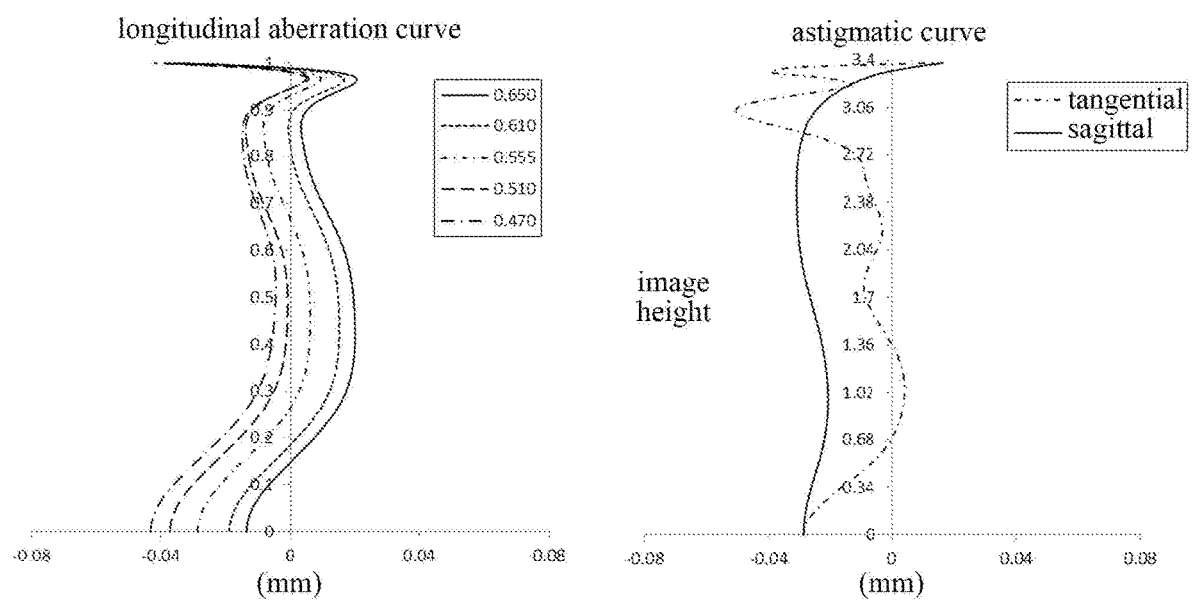
FIGS. 2A-2D respectively illustrate a longitudinal aberration curve, an astigmatic curve, a distortion curve, and a lateral color curve of the optical imaging lens assembly according to Embodiment 1.
Figures 2C, 2D:
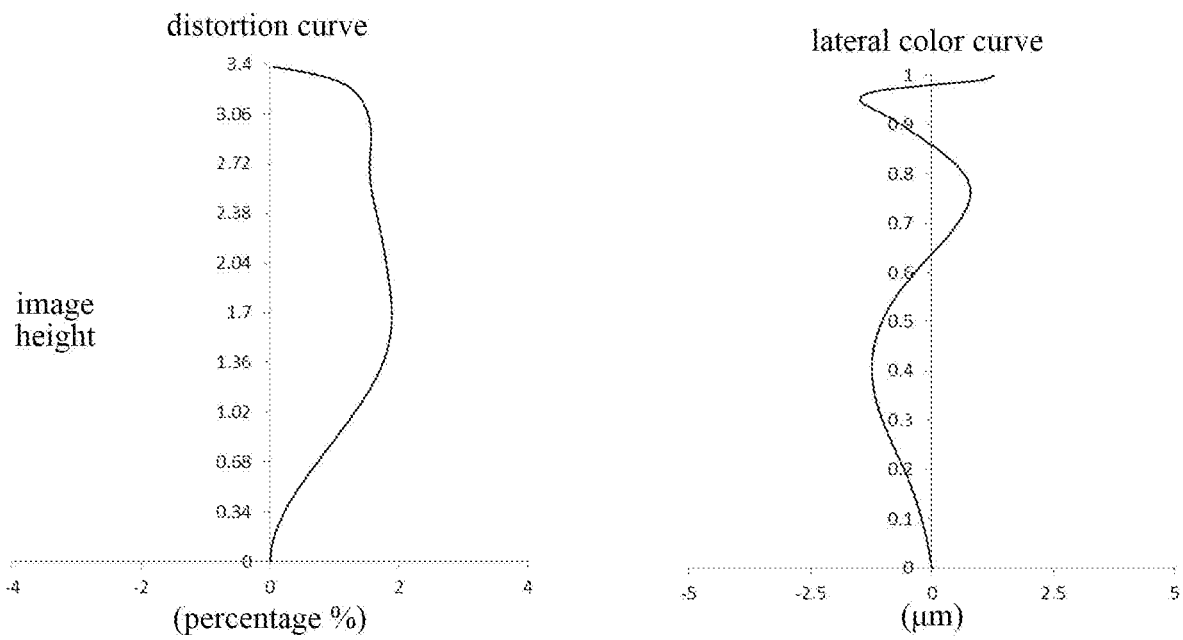

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
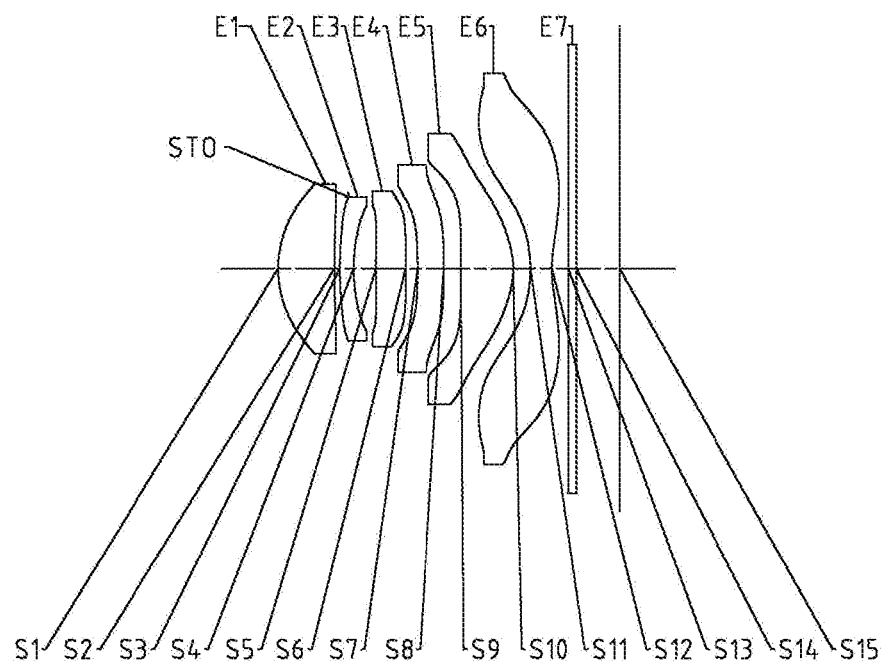
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imagine; lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 4 shows the surface type, the radius of curvature, the thickness, the material and the conic coefficient of each lens of the optical imaging lens assembly in Embodiment 2. The radius of curvature and the thickness are both in millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f6 of the lenses in Embodiment 2, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5603 | 0.7763 | 1.55 | 56.1 | −0.0611 |
| S2 | aspheric | 11.1371 | 0.1914 | | | −97.6212 |
| STO | spherical | infinite | −0.1175 | | | 0.0000 |
| S3 | aspheric | 4.2724 | 0.1900 | 1.67 | 20.4 | −8.3818 |
| S4 | aspheric | 2.2799 | 0.3074 | | | −1.4864 |
| S5 | aspheric | 10.8356 | 0.4084 | 1.54 | 55.7 | −88.9467 |
| S6 | aspheric | 25.0856 | 0.1667 | | | 96.1952 |
| S7 | aspheric | −14.7861 | 0.3668 | 1.67 | 20.4 | −92.0913 |
| S8 | aspheric | 6500.5456 | 0.2344 | | | −99.0000 |
| S9 | aspheric | 17.8250 | 0.7246 | 1.55 | 56.1 | −95.2008 |
| S10 | aspheric | −1.1799 | 0.2377 | | | −5.4670 |
| S11 | aspheric | −1.8933 | 0.2950 | 1.54 | 55.7 | −6.0075 |
| S12 | aspheric | 1.8258 | 0.2251 | | | −15.1161 |
| S13 | spherical | infinite | 0.1137 | 1.52 | 64.2 | |
| S14 | spherical | infinite | 0.5950 | | | |
| S15 | spherical | infinite | | | | |

TABLE 5

| surface number | A4 | A6 | A8 | A10 | A12 |
|---|---|---|---|---|---|
| S1 | −2.5128E−03 | 1.0375E−02 | −1.4817E−02 | −1.8752E−02 | 9.2366E−02 |
| S2 | −8.0798E−02 | 2.2813E−01 | −3.5527E−01 | 2.6513E−01 | 4.6676E−02 |
| S3 | −1.6177E−01 | 3.8785E−01 | −2.1085E−01 | −1.1410E+01 | 4.0090E+01 |
| S4 | −9.4374E−02 | 1.7667E−01 | 7.4134E−01 | −5.2303E+00 | 1.6894E+01 |
| S5 | −7.3021E−02 | −1.1940E−01 | 1.1160E+00 | −6.7096E+00 | 2.2685E+01 |
| S6 | −1.0062E−01 | −1.6232E−01 | 9.4181E−01 | −3.4414E+00 | 7.2742E+00 |
| S7 | −1.9007E−01 | 9.8035E−02 | −2.2234E−01 | 5.8901E−01 | −9.8827E−01 |
| S8 | −1.9516E−01 | 1.8358E−01 | −5.1331E−01 | 1.1398E+00 | −1.5116E+00 |
| S9 | −8.6024E−02 | 4.4738E−02 | −2.8325E−01 | 5.5768E−01 | −6.1980E−01 |
| S10 | −6.0167E−02 | 6.2902E−02 | −1.6749E−01 | 1.9309E−01 | −1.1159E−01 |
| S11 | −7.9397E−02 | −1.0258E−01 | 1.4645E−01 | −7.3022E−02 | 1.9951E−02 |
| S12 | −1.0438E−01 | 4.9213E−02 | −1.4879E−02 | 1.6292E−03 | 4.5133E−04 |

| surface number | A14 | A16 | A18 | A20 |
|---|---|---|---|---|
| S1 | −1.5014E−01 | 1.2369E−01 | −5.3214E−02 | 9.2238E−03 |
| S2 | −3.1684E−01 | 3.0669E−01 | −1.3500E−01 | 2.3604E−02 |
| S3 | −6.5285E+00 | 6.0714E+00 | −3.0810E+00 | 6.6605E−01 |
| S4 | −3.2604E+01 | 3.8262E+01 | −2.5177E+01 | 7.1684E+00 |
| S5 | −4.6670E+01 | 5.7403E+01 | −3.8917E+01 | 1.1210E+01 |
| S6 | −9.8883E+00 | 8.4180E+00 | −4.0335E+00 | 8.3105E−01 |
| S7 | 5.4843E−01 | 3.9398E−01 | −5.3643E−01 | 1.5485E−01 |
| S8 | 1.2088E+00 | −5.6316E−01 | 1.3987E−01 | −1.4281E−02 |
| S9 | 4.3011E−01 | −1.8582E−01 | 4.5481E−02 | −4.7438E−03 |
| S10 | 3.7176E−02 | −7.3988E−03 | 8.2905E−04 | −4.0681E−05 |
| S11 | −3.2797E−03 | 3.2384E−04 | −1.7679E−05 | 4.0820E−07 |
| S12 | −2.1122E−04 | 3.5702E−05 | −2.8058E−06 | 8.3608E−08 |

TABLE 6

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.23 | −7.63 | 35.19 | −22.16 | 2.05 | −1.69 | 3.94 | 4.72 | 3.36 |

Figure 4A:
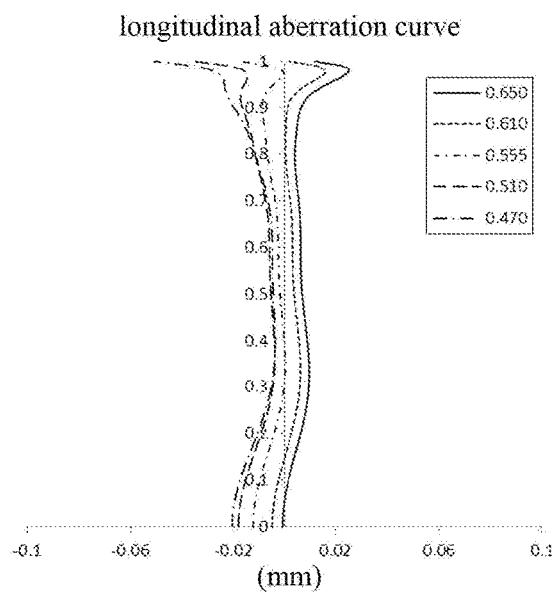
FIGS. 4A-4D respectively illustrate a longitudinal aberration curve, an astigmatic curve, a distortion curve, and a lateral color curve of the optical imaging lens assembly according to Embodiment 2.
Figure 4B:
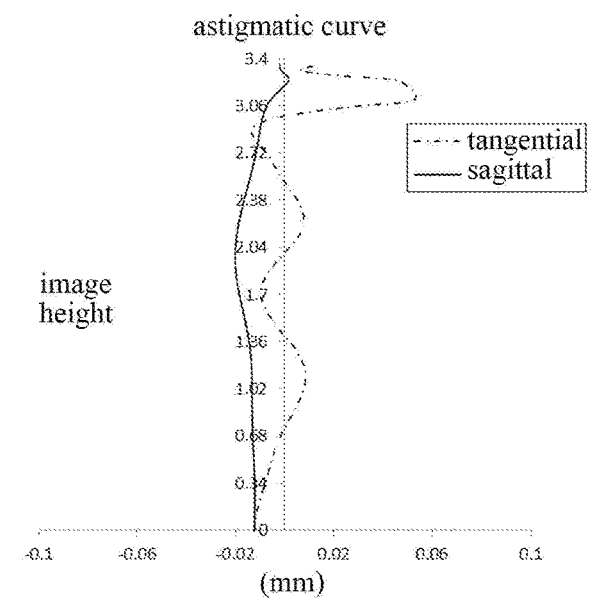
Figure 4C:
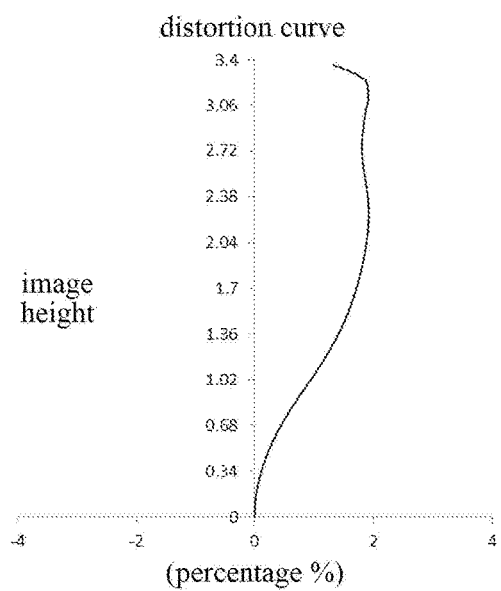
Figure 4D:
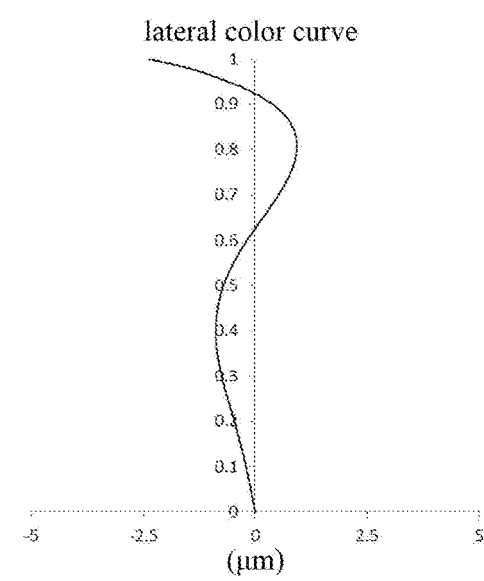

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S1 of the second lens E2 are both aspheric surfaces.

The third lens E3 has a positive refractive power, an object-side surface S5 of the third lens E3 is a concave surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 7 shows the surface type, the radius of curvature, the thickness, the material and the conic coefficient of each lens of the optical imaging lens assembly in Embodiment 3. The radius of curvature and the thickness are both in millimeters (mm). Table 8 shows the high-order coefficients applicable to each aspheric surface in Embodiment 3. The surface type of each aspheric surface may be defined by the formula (1) given in Embodiment 1, Table 9 shows the effective focal lengths f1-f6 of the lenses in Embodiment 3, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 7

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.5812 | 0.7746 | 1.55 | 56.1 | −0.0016 |
| S2 | aspheric | 13.6559 | 0.1115 | | | 97.1154 |
| STO | spherical | infinite | −0.0813 | | | 0.0000 |
| S3 | aspheric | 4.6441 | 0.2000 | 1.67 | 20.4 | 1.1869 |
| S4 | aspheric | 2.4558 | 0.3211 | | | −1.7257 |
| S5 | aspheric | −1330.2884 | 0.3866 | 1.55 | 56.1 | 99.0000 |
| S6 | aspheric | −32.4888 | 0.1546 | | | −94.7980 |
| S7 | aspheric | −92.8808 | 0.3291 | 1.67 | 20.4 | 99.0000 |
| S8 | aspheric | 15.7910 | 0.2861 | | | 98.9889 |
| S9 | aspheric | 15.6204 | 0.6775 | 1.55 | 56.1 | −90.1915 |
| S10 | aspheric | −1.2567 | 0.2290 | | | −7.3861 |
| S11 | aspheric | −3.1533 | 0.3186 | 1.54 | 55.7 | −2.7873 |
| S12 | aspheric | 1.4328 | 0.2425 | | | −10.9178 |
| S13 | spherical | infinite | 0.1101 | 1.52 | 64.2 | |
| S14 | spherical | infinite | 0.6300 | | | |
| S15 | spherical | infinite | | | | |

TABLE 8

| surface number | A4 | A6 | A8 | A10 | A12 |
|---|---|---|---|---|---|
| S1 | −2.2372E−03 | 2.2638E−02 | −7.3207E−02 | 1.9978E−01 | −3.6713E−01 |
| S2 | 3.6965E−12 | −2.9760E−20 | 1.4076E−29 | −5.7005E−37 | 1.1789E−44 |
| S3 | −3.9899E−02 | −2.3684E−02 | 2.2004E−01 | −5.1184E−01 | 6.6567E−01 |
| S4 | −2.1674E−02 | −3.6403E−02 | 5.2145E−01 | −2.7470E+00 | 8.9676E+00 |
| S5 | −4.6849E−02 | −1.6596E−01 | 1.0844E+00 | −5.4492E+00 | 1.5454E+01 |
| S6 | −1.3769E−01 | 1.3260E−01 | −7.9077E−02 | −1.0990E+00 | 3.7335E+00 |
| S7 | −2.8361E−01 | 3.4021E−01 | −4.8603E−01 | 3.2904E−01 | 3.3357E−01 |
| S8 | −2.7583E−01 | 3.5454E−01 | −7.7535E−01 | 1.6278E+00 | −2.4210E+00 |
| S9 | −8.7014E−02 | 7.8686E−02 | −3.7956E−01 | 8.4890E−01 | −1.0480E+00 |
| S10 | −1.2811E−01 | 2.1068E−01 | −4.2070E−01 | 5.3993E−01 | −3.9393E−01 |
| S11 | −1.5633E−01 | 4.4936E−03 | 8.3838E−02 | −5.3358E−02 | 1.6612E−02 |
| S12 | −1.4681E−01 | 1.0162E−01 | −5.5149E−02 | 2.1635E−02 | −6.0439E−03 |

| surface number | A14 | A16 | A18 | A20 |
|---|---|---|---|---|
| S1 | 4.3070E−01 | −3.0723E−01 | 1.2130E−01 | −2.0357E−02 |
| S2 | −1.3702E−52 | 9.0613E−61 | −3.1859E−69 | 4.6258E−78 |
| S3 | −4.8261E−01 | 1.9270E−01 | −3.9716E−02 | 3.3058E−03 |
| S4 | −1.8378E+01 | 2.2842E+01 | −1.5684E+01 | 4.5360E+00 |
| S5 | −2.6852E+01 | 2.8043E+00 | −1.6179E+01 | 3.9405E+00 |
| S6 | −6.8124E+00 | 7.4405E+00 | −4.4254E+00 | 1.0970E+00 |
| S7 | −1.8775E+00 | 2.9932E+00 | −2.0380E+00 | 5.0435E−01 |
| S8 | 2.2521E+00 | −1.2242E+00 | 3.5562E−01 | −4.2738E−02 |
| S9 | 7.6951E−01 | −3.4026E−01 | 8.3902E−02 | −8.8145E−03 |
| S10 | 1.6896E−01 | −4.2561E−02 | 5.8490E−03 | −3.3945E−04 |
| S11 | −3.0451E−03 | 3.3541E−04 | −2.0620E−05 | 5.4491E−07 |
| S12 | 1.1490E−03 | −1.4017E−04 | 9.8943E−06 | −3.0660E−07 |

TABLE 9

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.20 | −8.13 | 60.99 | −20.25 | 2.16 | −1.79 | 3.94 | 4.69 | 3.36 |

Figures 6C, 6D:
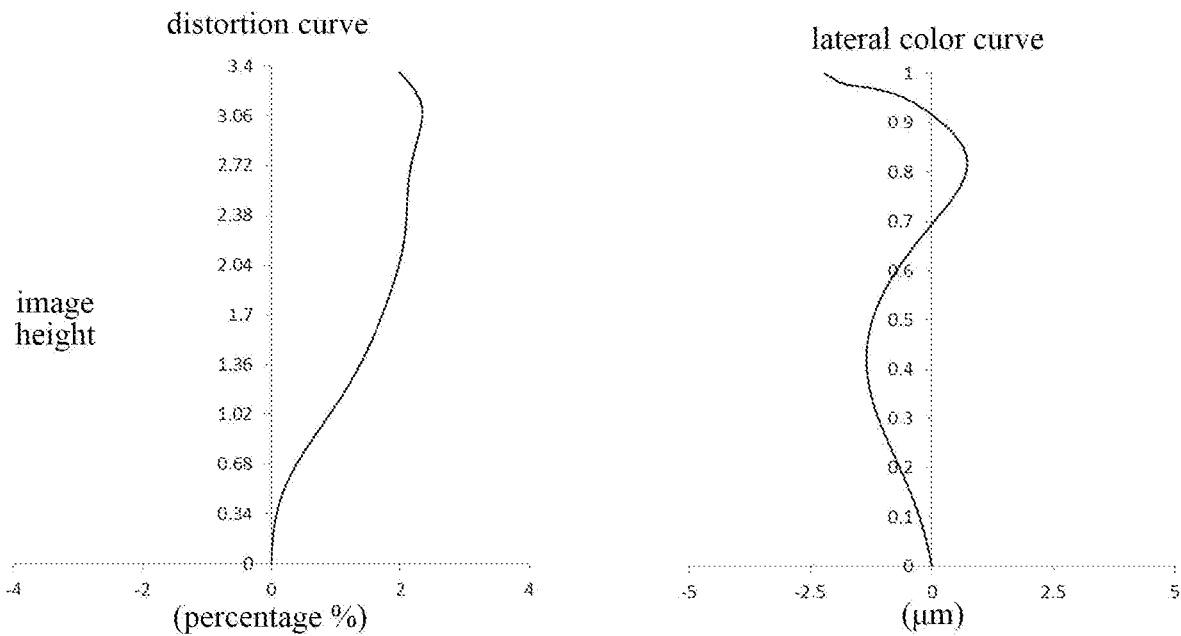

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
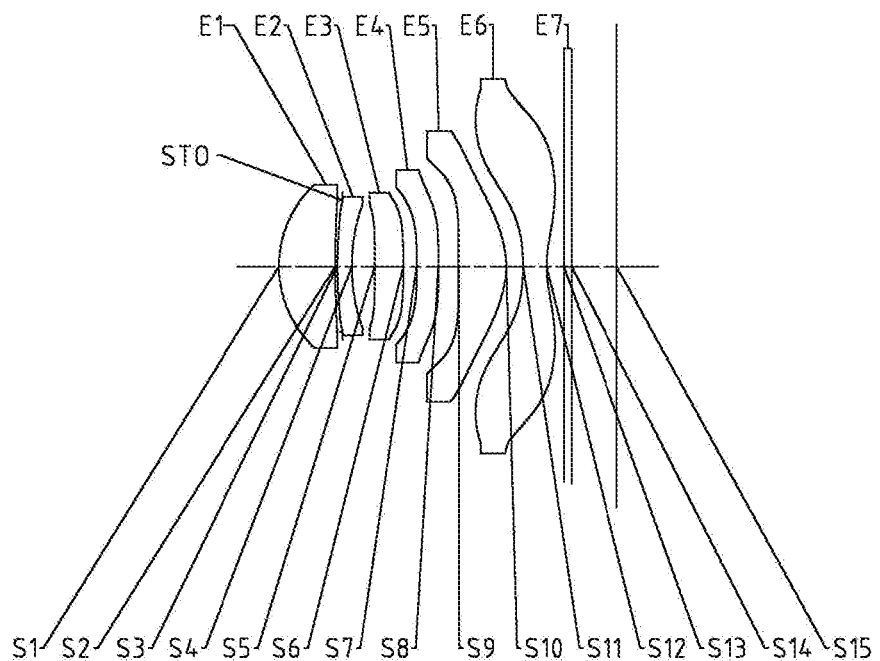
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a concave surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 10 shows the surface type, the radius of curvature, the thickness, the material and the conic coefficient of each lens of the optical imaging lens assembly in Embodiment 4. The radius of curvature and the thickness are both in millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f6 of the lenses in Embodiment 4, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 10

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.5696 | 0.7838 | 1.55 | 56.1 | −0.0417 |
| S2 | aspheric | 18.0567 | 0.0965 | | | 1.4880 |
| STO | spherical | infinite | −0.0686 | | | 0.0000 |
| S3 | aspheric | 5.5386 | 0.2000 | 1.67 | 20.4 | 4.2669 |
| S4 | aspheric | 2.5101 | 0.3185 | | | −1.0110 |
| S5 | aspheric | −2152.3402 | 0.3956 | 1.55 | 56.1 | 99.0000 |
| S6 | aspheric | −17.8234 | 0.1864 | | | 64.6231 |
| S7 | aspheric | −19.6340 | 0.3000 | 1.67 | 20.4 | −73.6342 |
| S8 | aspheric | 107.0512 | 0.2807 | | | 99.0000 |
| S9 | aspheric | 30.2144 | 0.6610 | 1.55 | 56.1 | −27.5361 |
| S10 | aspheric | −1.2638 | 0.2338 | | | −7.1845 |
| S11 | aspheric | −2.9254 | 0.3245 | 1.54 | 55.7 | −2.9739 |
| S12 | aspheric | 1.4770 | 0.2401 | | | −11.1816 |
| S13 | spherical | infinite | 0.1101 | 1.52 | 64.2 | |
| S14 | spherical | infinite | 0.6277 | | | |
| S15 | spherical | infinite | | | | |

TABLE 11

| surface number | A4 | A6 | A8 | A10 | A12 |
|---|---|---|---|---|---|
| S1 | 2.0962E−03 | −1.7919E−02 | 1.5641E−01 | −5.4777E−01 | 1.0880E+00 |
| S2 | −7.9553E−02 | 3.5465E−01 | −6.2860E−01 | −1.9810E−02 | 2.4761E+00 |
| S3 | −1.3901E−01 | 4.1727E−01 | −4.4612E−01 | −1.4795E+00 | 7.3543E+00 |
| S4 | −5.5602E−02 | 2.2282E−02 | 1.3017E+00 | −8.9688E+00 | 3.2836E+01 |
| S5 | −8.9891E−02 | 4.7988E−02 | −5.0376E−01 | 1.3651E+00 | −1.7307E+00 |
| S6 | −1.1070E−01 | −1.9065E−01 | 1.3556E+00 | −5.7192E+00 | 1.3885E+01 |
| S7 | −2.4266E−01 | 1.9768E−01 | −5.3676E−01 | 1.6307E+00 | −3.6415E+00 |
| S8 | −2.3429E−01 | 2.0643E−01 | −4.6354E−01 | 1.1481E+00 | −1.8883E+00 |
| S9 | −7.2507E−02 | 4.2411E−02 | −3.5487E−01 | 8.8708E−01 | −1.1552E+00 |
| S10 | −1.2751E−01 | 2.1577E−01 | −4.3789E−01 | 5.7013E−01 | −4.2170E−01 |
| S11 | −1.6996E−01 | 3.3090E−02 | 5.7797E−02 | −3.9900E−02 | 1.2326E−02 |
| S12 | −1.5053E−01 | 1.0815E−01 | −5.9459E−02 | 2.3049E−02 | −6.2865E−03 |

| surface number | A14 | A16 | A18 | A20 |
|---|---|---|---|---|
| S1 | −1.3015E+00 | 9.2785E−01 | −3.6364E−01 | 5.9993E−02 |
| S2 | −5.3486E+00 | 5.5349E+00 | −2.9232E+00 | 6.3239E−01 |
| S3 | −1.4549E+01 | 1.5622E+01 | −8.8892E+00 | 2.1103E+00 |
| S4 | −7.2248E+01 | 9.5471E+01 | −6.9856E+01 | 2.1869E+01 |
| S5 | −1.5066E+00 | 7.9741E+00 | −9.9008E+00 | 4.4150E+00 |
| S6 | −2.1189E+01 | 2.0037E+01 | −1.0677E+01 | 2.4520E+00 |
| S7 | 4.6453E+00 | −3.1412E+00 | 1.0360E+00 | −1.3006E−01 |
| S8 | 1.8713E+00 | −1.0646E+00 | 3.2080E−01 | −3.9797E−02 |
| S9 | 8.6338E−01 | −4.0888E−01 | 1.0477E−01 | −1.1367E−02 |
| S10 | 1.8298E−01 | −4.6515E−02 | 6.4370E−03 | −3.7543E−04 |
| S11 | −2.1850E−03 | 2.2923E−04 | −1.3242E−05 | 3.2348E−07 |
| S12 | 1.1680E−03 | −1.4066E−04 | 9.9512E−06 | −3.1378E−07 |

TABLE 12

| parameter | | | | | | | | |
|---|---|---|---|---|---|---|---|---|
| f1 (mm) | f2 (mm) | f3 (mm) | f4 (mm) | f5 (mm) | f6 (mm) | f (mm) | TTL (mm) | ImgH (mm) |
| numerical value 3.10 | −7.08 | 32.92 | −24.90 | 2.24 | −1.78 | 3.94 | 6.49 | 3.36 |

Figure 8A:
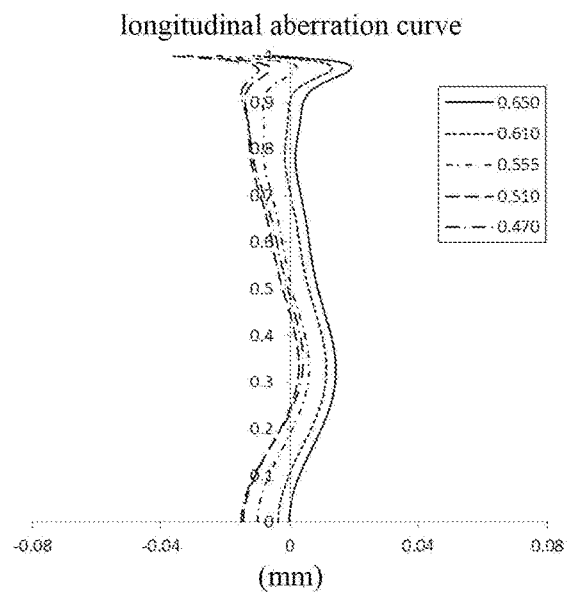
FIGS. 8A-8D respectively illustrate a longitudinal aberration curve, an astigmatic curve, a distortion curve, and a lateral color curve of the optical imaging lens assembly according to Embodiment 4.
Figure 8B:
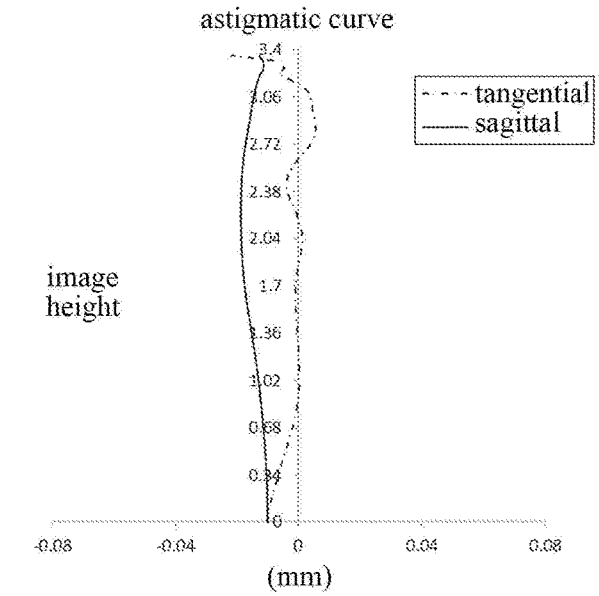
Figure 8C:
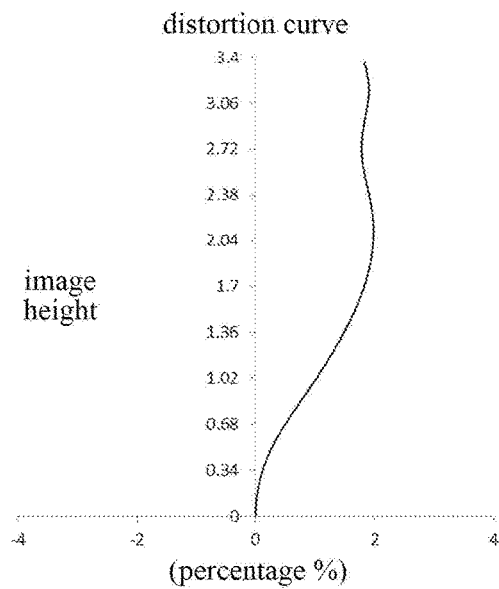
Figure 8D:
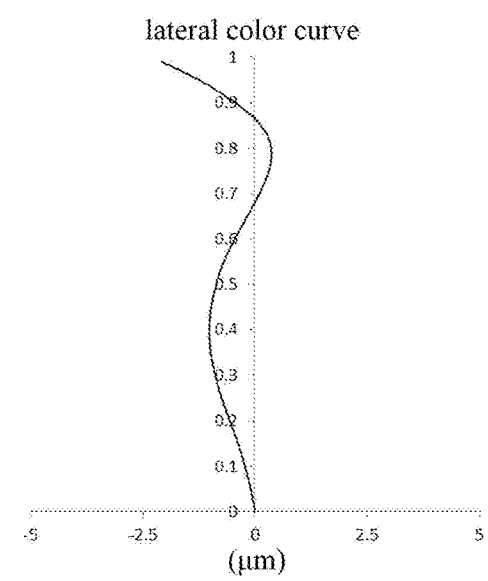

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
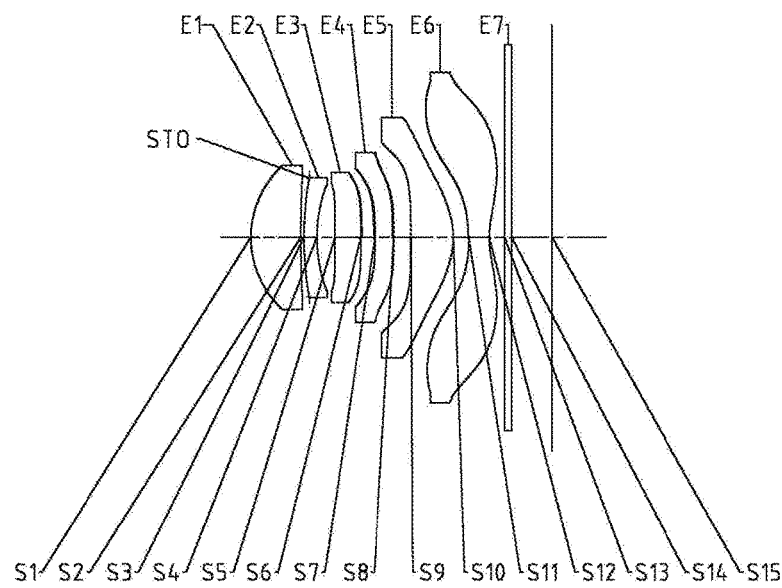
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 13 shows the surface type, the radius of curvature, the thickness, the material and the conic coefficient of each lens of the optical imaging lens assembly in Embodiment 5. The radius of curvature and the thickness are both in millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f6 of the lenses in Embodiment 5, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 13

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.5621 | 0.7770 | 1.55 | 56.1 | −0.0160 |
| S2 | aspheric | 12.9902 | 0.1376 | | | −66.4950 |
| STO | spherical | infinite | −0.0869 | | | 0.0000 |
| S3 | aspheric | 4.7473 | 0.2000 | 1.67 | 20.4 | −6.3242 |
| S4 | aspheric | 2.3114 | 0.2817 | | | −1.5955 |
| S5 | aspheric | 21.0562 | 0.4011 | 1.55 | 56.1 | −67.7725 |

TABLE 13-continued

| surface number | surface type | radius of curvature | thickness | material refractive index | abbe number | conic coefficient |
|---|---|---|---|---|---|---|
| S6 | aspheric | −41.5257 | 0.2208 | | | 93.4454 |
| S7 | aspheric | −12.5424 | 0.3000 | 1.67 | 20.4 | −7.0940 |
| S8 | aspheric | −39.8813 | 0.2644 | | | 64.4104 |
| S9 | aspheric | −4094.5876 | 0.6615 | 1.55 | 56.1 | −98.6948 |
| S10 | aspheric | −1.2219 | 0.2406 | | | −6.9070 |
| S11 | aspheric | −3.1151 | 0.3154 | 1.54 | 55.7 | −3.2214 |
| S12 | aspheric | 1.4490 | 0.2398 | | | −10.3623 |
| S13 | spherical | infinite | 0.1099 | 1.52 | 64.2 | |
| S14 | spherical | infinite | 0.6274 | | | |
| S15 | spherical | infinite | | | | |

TABLE 14

| surface number | A4 | A6 | A8 | A10 | A12 |
|---|---|---|---|---|---|
| S1 | −4.3052E−04 | −7.3932E−03 | 7.3752E−02 | −2.6505E−01 | 5.2539E−01 |
| S2 | −9.8380E−02 | 3.9997E−01 | −9.1438E−01 | 1.3617E+00 | −1.2359E+00 |
| S3 | −1.6963E−01 | 5.3226E−01 | −7.4253E−01 | −4.4412E−01 | 4.7578E+00 |
| S4 | −8.8498E−02 | 2.6101E−01 | −5.4720E−02 | −1.8327E+00 | 7.8527E+00 |
| S5 | −9.2971E−02 | −7.4478E−02 | 9.4182E−01 | −7.1317E+00 | 2.8609E+01 |
| S6 | −1.0967E−01 | −1.7509E−01 | 1.1359E+00 | −4.5520E+00 | 1.0631E+01 |
| S7 | −2.2394E−01 | 1.0070E−01 | −3.8667E−01 | 1.5616E+00 | −3.8143E+00 |
| S8 | −2.1033E−01 | 1.1027E−01 | −2.9045E−01 | 8.7556E−01 | −1.5037E+00 |
| S9 | −5.2961E−02 | 3.3440E−03 | −2.9337E−01 | 8.0200E−01 | −1.0610E+00 |
| S10 | −1.2548E−01 | 2.0830E−01 | −4.2143E−01 | 5.4266E−01 | −3.9534E−01 |
| S11 | −1.5745E−01 | 2.6133E−03 | 8.6724E−02 | −5.4984E−02 | 1.7064E−02 |
| S12 | −1.5865E−01 | 1.1543E−01 | −6.4941E−02 | 2.5831E−02 | −7.1317E−03 |

| surface number | A14 | A16 | A18 | A20 |
|---|---|---|---|---|
| S1 | −6.3062E−01 | 4.5222E−01 | −1.7888E−01 | 2.9742E−02 |
| S2 | 4.6609E−01 | 2.0912E−01 | −2.7512E−01 | 7.9185E−02 |
| S3 | −1.0661E+01 | 1.2335E+01 | −7.4790E+00 | 1.8849E+00 |
| S4 | −1.7784E+01 | 2.4387E+01 | −1.9091E+01 | 6.6270E+00 |
| S5 | −6.8296E+01 | 9.6284E+01 | −7.4215E+01 | 2.4208E+01 |
| S6 | −1.5661E+01 | 1.4315E+01 | −7.3949E+00 | 1.6543E+00 |
| S7 | 5.1732E+00 | −3.8262E+00 | 1.4709E+00 | −2.3759E−01 |
| S8 | 1.4842E+00 | −8.2164E−01 | 2.3677E−01 | −2.7683E−02 |
| S9 | 8.1688E−01 | −3.7702E−01 | 9.6452E−02 | −1.0423E−02 |
| S10 | 1.6909E−01 | −4.2487E−02 | 5.8303E−03 | −3.3818E−04 |
| S11 | −3.1099E−03 | 3.3951E−04 | −2.0630E−05 | 5.3754E−07 |
| S12 | 1.3155E−03 | −1.5392E−04 | 1.0361E−05 | −3.0615E−07 |

TABLE 15

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.18 | −7.00 | 25.65 | −27.60 | 2.24 | −1.80 | 3.94 | 4.69 | 3.36 |

Figures 10A, 10B:
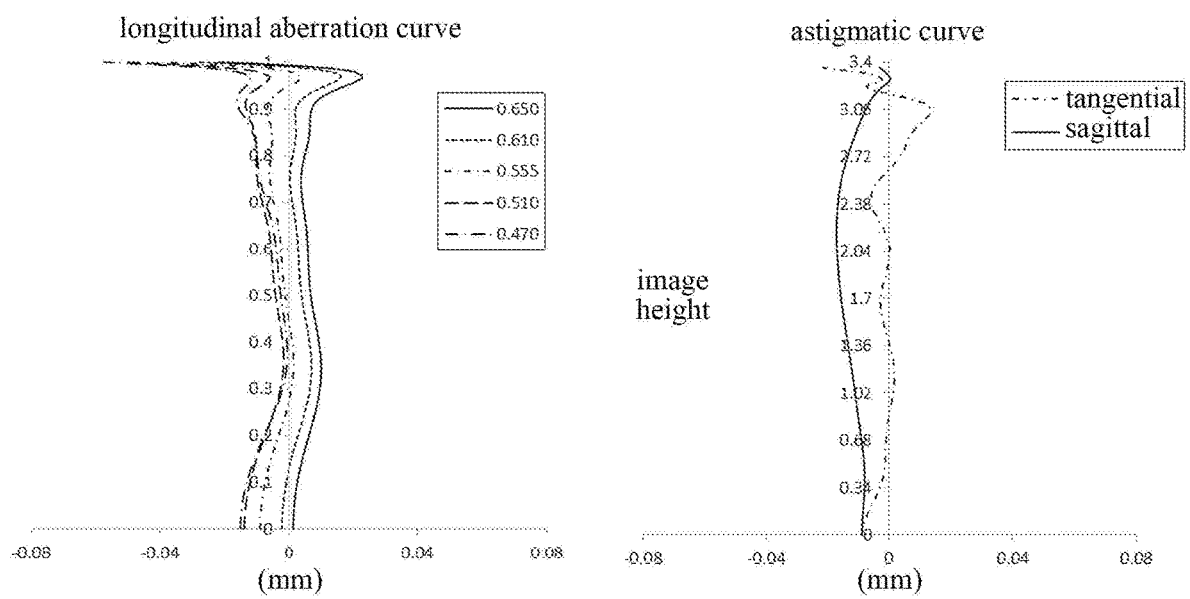

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 16 shows the surface type, the radius of curvature, the thickness, the material and the conic coefficient of each lens of the optical imaging lens assembly in Embodiment 6. The radius of curvature and the thickness are both in millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f6 of the lenses in Embodiment 6, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5707 | 0.7760 | 1.55 | 56.1 | −0.0146 |
| S2 | aspheric | 13.2858 | 0.1399 | | | −58.3978 |
| STO | spherical | infinite | −0.0850 | | | 0.0000 |
| S3 | aspheric | 4.6666 | 0.2000 | 1.67 | 20.4 | −6.4060 |
| S4 | aspheric | 2.2866 | 0.2877 | | | −1.6081 |
| S5 | aspheric | 21.1616 | 0.4072 | 1.55 | 56.1 | −95.7325 |
| S6 | aspheric | −32.2045 | 0.2265 | | | 99.0000 |
| S7 | aspheric | −11.1589 | 0.3000 | 1.67 | 20.4 | −29.0116 |
| S8 | aspheric | −32.3603 | 0.2553 | | | −99.0000 |
| S9 | aspheric | 1584.6245 | 0.6582 | 1.55 | 56.1 | 99.0000 |
| S10 | aspheric | −1.2324 | 0.2482 | | | −6.8245 |
| S11 | aspheric | −3.1158 | 0.3167 | 1.54 | 55.7 | −3.2747 |
| S12 | aspheric | 1.4588 | 0.2369 | | | −10.4966 |
| S13 | spherical | infinite | 0.1100 | 1.52 | 64.2 | |
| S14 | spherical | infinite | 0.6226 | | | |
| S15 | spherical | infinite | | | | |

TABLE 17

| surface number | A4 | A6 | A8 | A10 | A12 |
|---|---|---|---|---|---|
| S1 | −7.7162E−04 | −4.3655E−03 | 5.3153E−02 | −1.9167E−01 | 3.7214E−01 |
| S2 | −9.3470E−02 | 3.9236E−01 | −1.0142E+00 | 1.9951E+00 | −3.0139E+00 |
| S3 | −1.6533E−01 | 5.1388E−01 | −7.5235E−01 | −1.1536E−01 | 3.4784E+00 |
| S4 | −9.0491E−02 | 2.8011E−01 | −2.3672E−01 | −7.5047E−01 | 4.0019E+00 |
| S5 | −9.1670E−02 | −4.7733E−02 | 5.9891E−01 | −5.0309E+00 | 2.1156E+01 |
| S6 | −1.0753E−01 | −1.4497E−01 | 8.9649E−01 | −3.6108E+00 | 8.3949E+00 |
| S7 | −2.1862E−01 | 1.1189E−01 | −4.4952E−01 | 1.6998E+00 | −4.0028E+00 |

TABLE 17-continued

| | | | | | |
|---|---|---|---|---|---|
| S8 | −2.0637E−01 | 1.1557E−01 | −3.1317E−01 | 9.0238E−01 | −1.5180E+00 |
| S9 | −5.3842E−02 | 1.2241E−02 | −3.0706E−01 | 8.0354E−01 | −1.0427E+00 |
| S10 | −1.1734E−01 | 1.8755E−01 | −3.7758E−01 | 4.8157E−01 | −3.4483E−01 |
| S11 | −1.5411E−01 | −2.0030E−03 | 8.9531E−02 | −5.5964E−02 | 1.7263E−02 |
| S12 | −1.5261E−01 | 1.0559E−01 | −5.6017E−02 | 2.1015E−02 | −5.4993E−03 |

| surface number | A14 | A16 | A18 | A20 |
|---|---|---|---|---|
| S1 | −4.3617E−01 | 3.0496E−01 | −1.1759E−01 | 1.8985E−02 |
| S2 | 3.2904E+00 | −2.3980E+00 | 1.0282E+00 | −1.9396E−01 |
| S3 | −8.1209E+00 | 9.4782E+00 | −5.7552E+00 | 1.4495E+00 |
| S4 | −9.3432E+00 | 1.3199E+01 | −1.0843E+01 | 4.0189E+00 |
| S5 | −5.2012E+01 | 7.4723E+01 | −5.8319E+01 | 1.9192E+01 |
| S6 | −1.2307E+01 | 1.1224E+01 | −5.8011E+00 | 1.3017E+00 |
| S7 | 5.3599E+00 | −3.9545E+00 | 1.5188E+00 | −2.4309E−01 |
| S8 | 1.4891E+00 | −8.2583E−01 | 2.3983E−01 | −2.8440E−02 |
| S9 | 7.9247E−01 | −3.6112E−01 | 9.1126E−02 | −9.7116E−03 |
| S10 | 1.4457E−01 | −3.5600E−02 | 4.7912E−03 | −2.7282E−04 |
| S11 | −3.1306E−03 | 3.3992E−04 | −2.0525E−05 | 5.3098E−07 |
| S12 | 9.6483E−04 | −1.0772E−04 | 6.9626E−06 | −1.9961E−07 |

TABLE 18

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.19 | −6.97 | 23.45 | −25.73 | 2.26 | −1.81 | 3.95 | 4.70 | 3.36 |

Figure 12A:
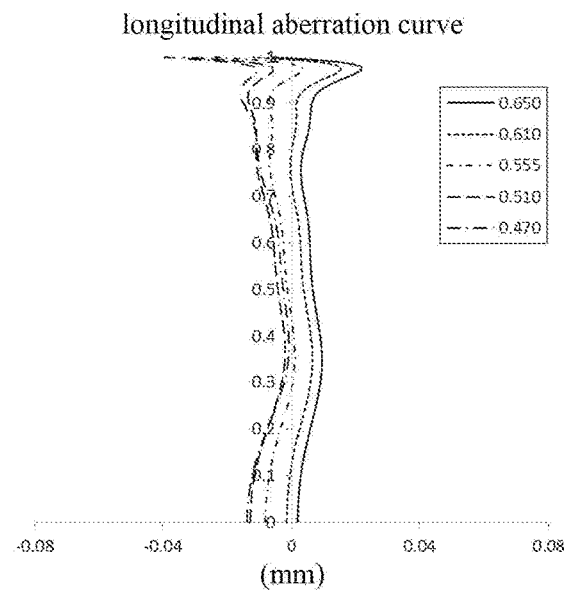
FIGS. 12A-12D respectively illustrate a longitudinal aberration curve, an astigmatic curve, a distortion curve, and a lateral color curve of the optical imaging lens assembly according to Embodiment 6.
Figure 12B:
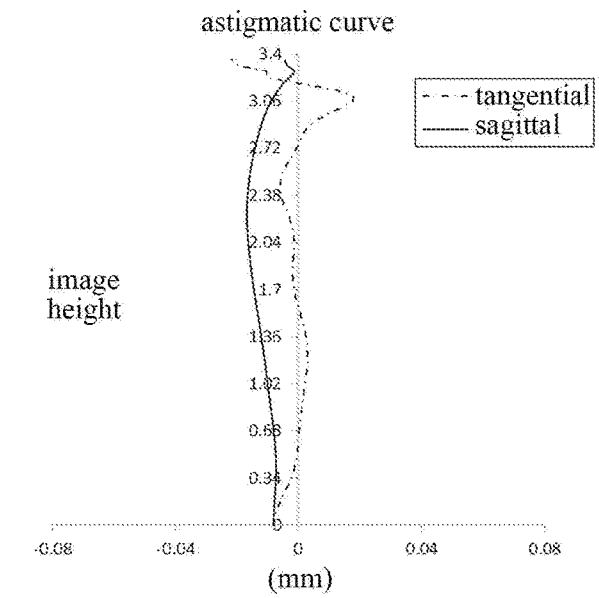
Figure 12C:
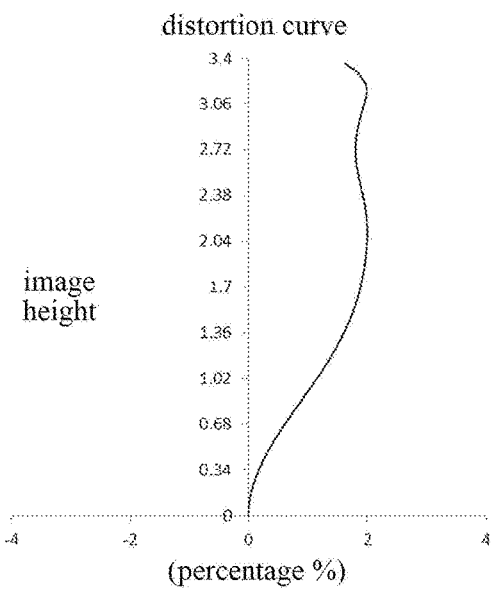
Figure 12D:
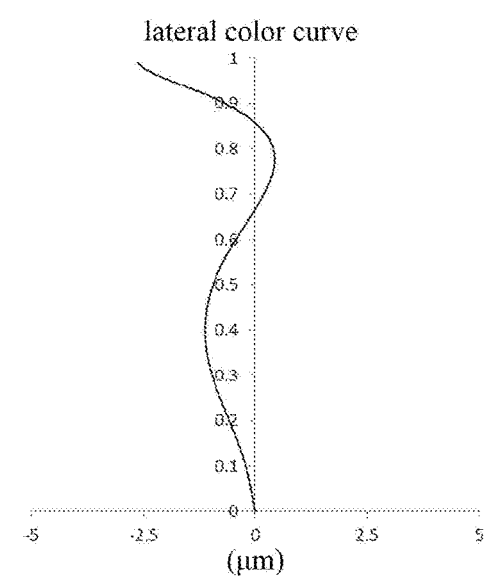

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 19 shows the surface type, the radius of curvature, the thickness, the material and the conic coefficient of each lens of the optical imaging lens assembly in Embodiment 7. The radius of curvature and the thickness are both in millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f6 of the lenses in Embodiment 7, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 19

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5636 | 0.7772 | 1.55 | 56.1 | −0.0166 |
| S2 | aspheric | 12.9472 | 0.1405 | | | −65.0737 |
| STO | spherical | infinite | −0.0876 | | | 0.0000 |
| S3 | aspheric | 4.6976 | 0.2000 | 1.67 | 20.4 | −6.1698 |
| S4 | aspheric | 2.3019 | 0.2808 | | | −1.6122 |
| S5 | aspheric | 21.1409 | 0.4024 | 1.55 | 56.1 | −59.8733 |
| S6 | aspheric | −39.1077 | 0.2222 | | | 79.1715 |
| S7 | aspheric | −11.9527 | 0.3000 | 1.67 | 20.4 | −5.9850 |
| S8 | aspheric | −35.4622 | 0.2643 | | | 16.9439 |
| S9 | aspheric | 2686.6206 | 0.6642 | 1.55 | 56.1 | −99.0000 |
| S10 | aspheric | −1.2232 | 0.2411 | | | −6.8731 |
| S11 | aspheric | −3.1043 | 0.3165 | 1.54 | 55.7 | −3.2306 |
| S12 | aspheric | 1.4485 | 0.2363 | | | −10.3462 |
| S13 | spherical | infinite | 0.1093 | 1.52 | 64.2 | |
| S14 | spherical | infinite | 0.6238 | | | |
| S15 | spherical | infinite | | | | |

TABLE 20

| surface number | A4 | A6 | A8 | A10 | A12 |
|---|---|---|---|---|---|
| S1 | 4.0657E−04 | −1.2589E−02 | 8.9430E−02 | −2.9210E−01 | 5.5053E−01 |
| S2 | −9.6389E−02 | 3.9074E−01 | −8.9604E−01 | 1.3437E+00 | −1.2282E+00 |
| S3 | −1.6962E−01 | 5.3935E−01 | −8.3008E−01 | 1.3253E−02 | 3.4487E+00 |
| S4 | −9.0003E−02 | 2.6729E−01 | −6.7959E−01 | −1.8274E+00 | 7.9094E+00 |
| S5 | −9.1496E−02 | −9.0206E−02 | 1.0147E+00 | −7.2476E+00 | 2.8319E+01 |
| S6 | −1.1343E−01 | −1.2355E−01 | 7.9419E−01 | −3.2057E+00 | 7.3541E+00 |
| S7 | −2.2606E−01 | 1.2239E−01 | −4.9908E−01 | 1.9051E+00 | −4.4708E+00 |
| S8 | −2.1173E−01 | 1.2033E−01 | −3.1758E−01 | 9.1787E−01 | −1.5389E+00 |
| S9 | −5.6048E−02 | 1.5845E−02 | −3.1808E−01 | 8.3488E−01 | −1.0880E+00 |
| S10 | −1.2485E−01 | 2.0638E−01 | −4.1609E−01 | 5.3415E−01 | −3.8804E−01 |
| S11 | −1.5715E−01 | 2.1407E−03 | 8.7017E−02 | −5.5066E−02 | 1.7066E−02 |
| S12 | −1.5745E−01 | 1.1302E−01 | −6.2577E−02 | 2.4509E−02 | −6.6724E−03 |

| surface number | A14 | A16 | A18 | A20 |
|---|---|---|---|---|
| S1 | −6.3938E−01 | 4.4786E−01 | −1.7402E−01 | 2.8531E−02 |
| S2 | 4.6501E−01 | 2.1263E−01 | −2.7965E−01 | 8.0678E−02 |
| S3 | −8.4352E+00 | 1.0096E+01 | −6.2503E+00 | 1.6011E+00 |
| S4 | −1.7873E+01 | 2.4274E+01 | −1.8741E+01 | 6.4064E+00 |
| S5 | −6.6557E+01 | 9.2879E+01 | −7.1099E+01 | 2.3080E+01 |
| S6 | −1.0666E+01 | 9.6781E+00 | −5.0021E+00 | 1.1285E+00 |
| S7 | 5.9750E+00 | −4.4389E+00 | 1.7377E+00 | −2.8790E−01 |
| S8 | 1.4941E+00 | −8.1649E−01 | 2.3262E−01 | −2.6901E−02 |
| S9 | 8.2906E−01 | −3.7901E−01 | 9.6085E−02 | −1.0298E−02 |
| S10 | 1.6554E−01 | −4.1503E−02 | 5.6850E−03 | −3.2927E−04 |
| S11 | −3.1053E−03 | 3.3834E−04 | −2.0510E−05 | 5.3300E−07 |
| S12 | 1.2148E−03 | −1.4045E−04 | 9.3591E−06 | −2.7447E−07 |

TABLE 21

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.18 | −7.01 | 25.20 | −27.22 | 2.24 | −1.80 | 3.94 | 4.69 | 3.36 |

Figures 14C, 14D:
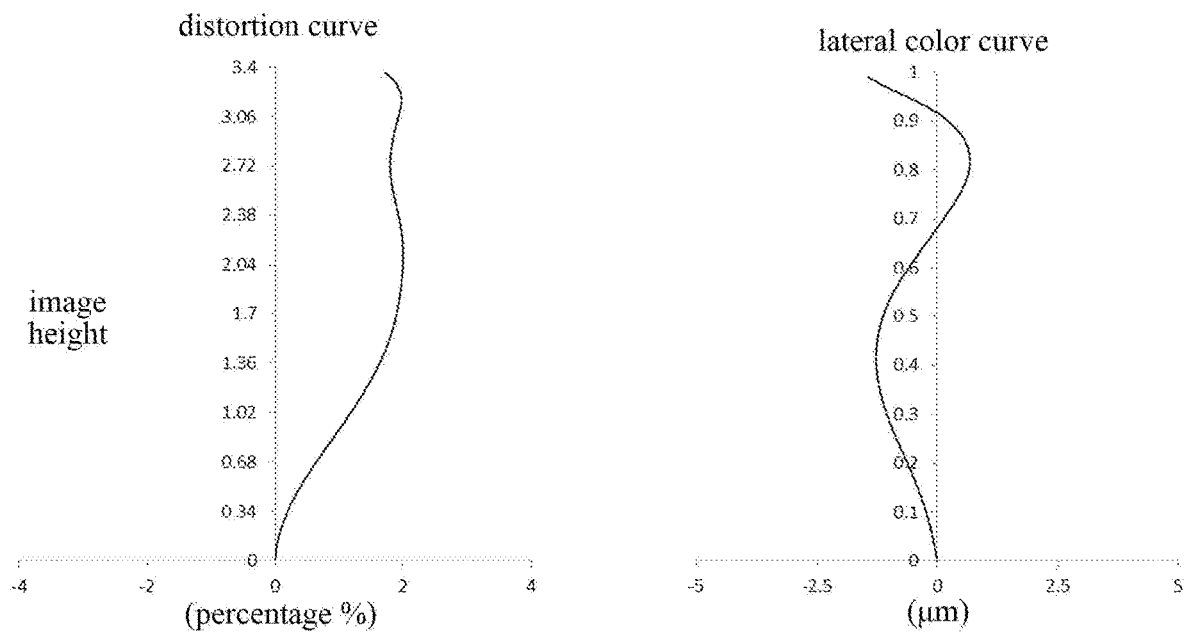

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
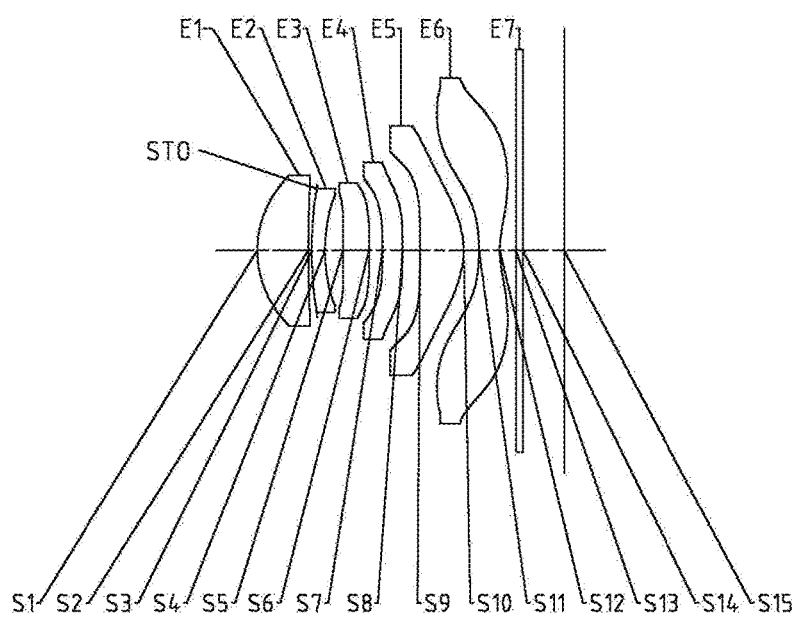
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 22 shows the surface type, the radius of curvature, the thickness, the material and the conic coefficient of each lens of the optical imaging lens assembly in Embodiment 8. The radius of curvature and the thickness are both in millimeters (mm). Table 23 shows the high-order coefficients applicable to each aspheric surface in Embodiment 8. The surface type of each aspheric surface may be defined by the formula (1) given in. Embodiment 1, Table 24 shows the effective focal lengths f1-f6 of the lenses in Embodiment 8, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.5571 | 0.7784 | 1.55 | 56.1 | −0.0234 |
| S2 | aspheric | 13.0338 | 0.1370 | | | −85.5313 |
| STO | spherical | infinite | −0.0849 | | | 0.0000 |
| S3 | aspheric | 4.9332 | 0.2000 | 1.67 | 20.4 | −6.0036 |
| S4 | aspheric | 2.3477 | 0.2778 | | | −1.5577 |

TABLE 22-continued

| surface number | surface type | radius of curvature | thickness | material refractive index | abbe number | conic coefficient |
|---|---|---|---|---|---|---|
| S5 | aspheric | 19.2433 | 0.3964 | 1.55 | 56.1 | −96.2233 |
| S6 | aspheric | −51.1558 | 0.2185 | | | −3.9533 |
| S7 | aspheric | −11.9023 | 0.3000 | 1.67 | 20.4 | −0.7849 |
| S8 | aspheric | −37.1979 | 0.2661 | | | 65.8340 |
| S9 | aspheric | 355.9846 | 0.6700 | 1.55 | 56.1 | −49.5000 |
| S10 | aspheric | −1.2084 | 0.2310 | | | −6.9455 |
| S11 | aspheric | −3.1983 | 0.3154 | 1.54 | 55.7 | −3.0162 |
| S12 | aspheric | 1.4119 | 0.2454 | | | −10.3769 |
| S13 | spherical | infinite | 0.1101 | 1.52 | 64.2 | |
| S14 | spherical | infinite | 0.6288 | | | |
| S15 | spherical | infinite | | | | |

TABLE 23

| surface number | A4 | A6 | A8 | A10 | A12 |
|---|---|---|---|---|---|
| S1 | −4.2273E−04 | −7.2302E−03 | 7.1161E−02 | −2.5774E−01 | 5.1654E−01 |
| S2 | −9.9919E−02 | 4.0223E−01 | −9.2213E−01 | 1.3911E+00 | −1.3076E+00 |
| S3 | −1.7306E−01 | 5.4868E−01 | −8.0064E−01 | −2.4247E−01 | 4.2695E+00 |
| S4 | −8.9457E−02 | 2.5337E−01 | 9.9941E−02 | −2.7156E+00 | 1.0612E+01 |
| S5 | −9.4630E−02 | −5.2614E−02 | 7.2128E−01 | −5.8652E+00 | 2.4258E+01 |
| S6 | −1.1113E−01 | −1.6505E−01 | 1.0981E+00 | −4.4051E+00 | 1.0232E+01 |
| S7 | −2.3000E−01 | 1.3792E−01 | −5.1487E−01 | 1.9042E+00 | −4.4388E+00 |
| S8 | −2.1879E−01 | 1.4613E−01 | −3.7491E−01 | 1.0277E+00 | −1.7006E+00 |
| S9 | −5.9877E−02 | 1.0460E−02 | −2.7767E−01 | 7.4308E−01 | −9.7618E−01 |
| S10 | −1.3239E−01 | 2.1441E−01 | −4.1652E−01 | 5.2809E−01 | −3.8273E−01 |
| S11 | −1.6814E−01 | 2.0964E−02 | 7.2970E−02 | −4.9102E−02 | 1.5484E−02 |
| S12 | −1.5922E−01 | 1.1603E−01 | −6.5021E−02 | 2.5806E−02 | −7.1475E−03 |

| surface number | A14 | A16 | A18 | A20 |
|---|---|---|---|---|
| S1 | −6.2892E−01 | 4.5743E−01 | −1.8334E−01 | 3.0835E−02 |
| S2 | 5.6996E−01 | 1.1890E−01 | −2.3124E−01 | 6.9960E−02 |
| S3 | −9.9362E+00 | 1.1717E+01 | −7.2084E+00 | 1.8403E+00 |
| S4 | −2.2897E+01 | 2.9884E+01 | −2.2184E+01 | 7.2924E+00 |
| S5 | −5.9138E+01 | 8.4696E+01 | −6.6140E+01 | 2.1816E+01 |
| S6 | −1.5000E+01 | 1.3687E+01 | −7.0949E+00 | 1.6030E+00 |
| S7 | 5.9233E+00 | −4.3904E+00 | 1.7015E+00 | −2.7480E−01 |
| S8 | 1.6593E+00 | −9.2243E−01 | 2.6981E−01 | −3.2279E−02 |
| S9 | 7.4769E−01 | −3.4390E−01 | 8.7856E−02 | −9.4937E−03 |
| S10 | 1.6336E−01 | −4.0999E−02 | 5.6202E−03 | −3.2560E−04 |
| S11 | −2.8348E−03 | 3.0910E−04 | −1.8673E−05 | 4.8154E−07 |
| S12 | 1.3313E−03 | −1.5826E−04 | 1.0873E−05 | −3.2859E−07 |

TABLE 24

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.16 | −6.94 | 25.66 | −26.42 | 2.21 | −1.78 | 3.94 | 4.69 | 3.36 |

Figure 16A:
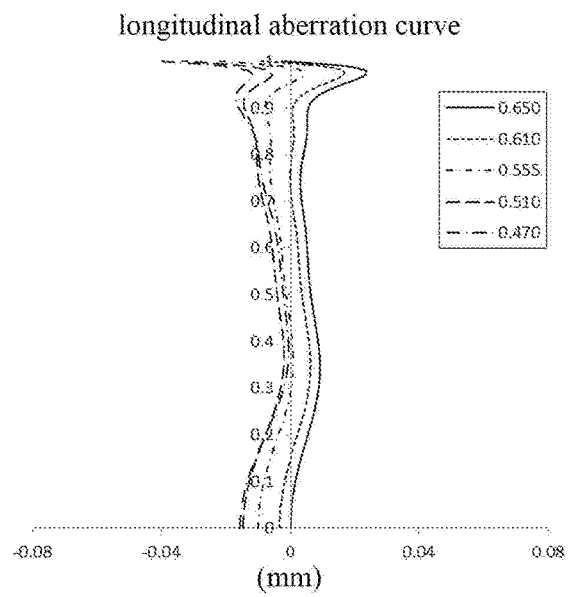
FIGS. 16A-16D respectively illustrate a longitudinal aberration curve, an astigmatic curve, a distortion curve, and a lateral color curve of the optical imaging lens assembly according to Embodiment 6.
Figure 16B:
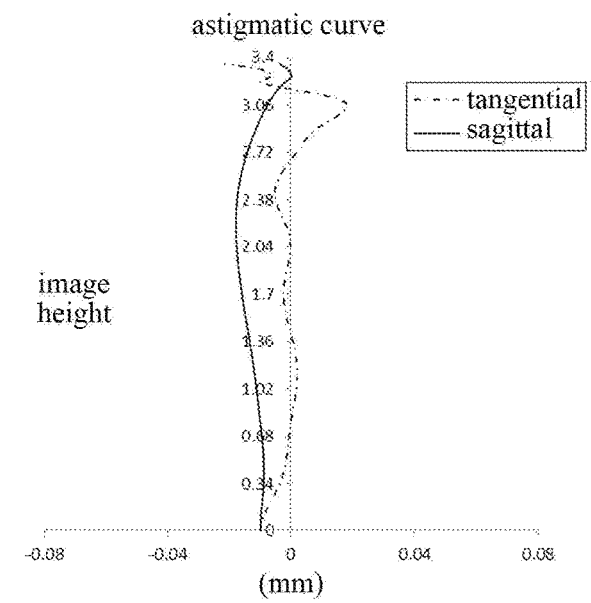
Figure 16C:
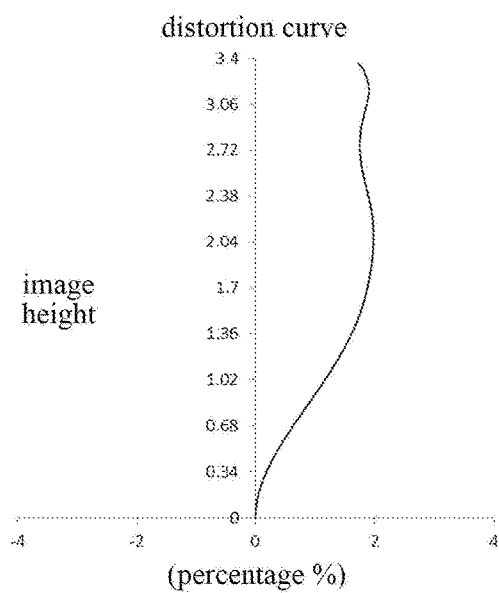
Figure 16D:
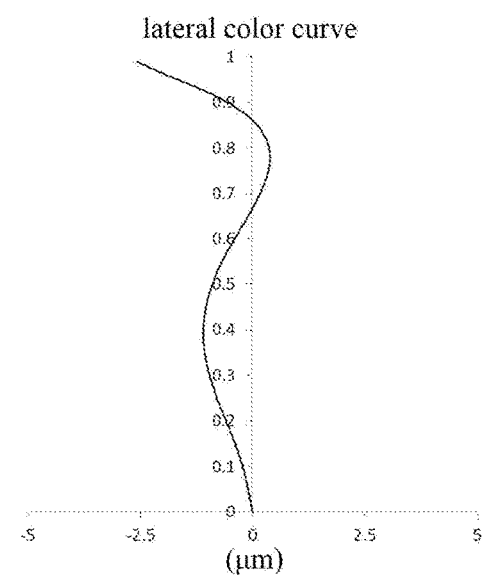

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly includes a first lens E1, a second lens E2, a third lens E3, a fourth lens E4, a fifth lens E5, a sixth len E6, and an image plane S15 sequentially from an object side to an image side along an optical axis. The optical imaging lens assembly may further include a photosensitive element disposed on the image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO for limiting light beams may be disposed between the first lens E1 and the second lens E2, to improve the imaging quality of the optical imaging lens assembly.

Table 25 shows the surface type, the radius of curvature, the thickness, the material and the conic coefficient of each lens of the optical imaging lens assembly in Embodiment 9. The radius of curvature and the thickness are both in millimeters (mm). Table 26 shows the high-order coefficients applicable to each aspheric surface in Embodiment 9. The surface type of each aspheric surface may be defined by the formula (1) given in Embodiment 1. Table 27 shows the effective focal lengths f1-f6 of the lenses in Embodiment 9, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 25

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.5558 | 0.7783 | 1.55 | 56.1 | −0.0324 |
| S2 | aspheric | 12.0405 | 0.1392 | | | −99.0000 |
| STO | spherical | infinite | −0.0864 | | | 0.0000 |
| S3 | aspheric | 4.9134 | 0.2000 | 1.67 | 20.4 | −5.7776 |
| S4 | aspheric | 2.3807 | 0.2771 | | | −1.4836 |
| S5 | aspheric | 17.5554 | 0.3944 | 1.55 | 56.1 | −89.8524 |
| S6 | aspheric | −82.6083 | 0.2156 | | | −99.0000 |
| S7 | aspheric | −11.7142 | 0.3000 | 1.67 | 20.4 | −1.8557 |
| S8 | aspheric | −35.4610 | 0.2649 | | | 10.5710 |
| S9 | aspheric | 187.1627 | 0.6772 | 1.55 | 56.1 | 99.0000 |
| S10 | aspheric | −1.1718 | 0.2106 | | | −7.0143 |
| S11 | aspheric | −3.2748 | 0.3152 | 1.54 | 55.7 | −2.7636 |
| S12 | aspheric | 1.3474 | 0.2615 | | | −10.5090 |
| S13 | spherical | infinite | 0.1101 | 1.52 | 64.2 | |
| S14 | spherical | infinite | 0.6324 | | | |
| S15 | spherical | infinite | | | | |

TABLE 26

| surface number | A4 | A6 | A8 | A10 | A12 |
|---|---|---|---|---|---|
| S1 | −7.9682E−04 | −4.9632E−03 | 5.8681E−02 | −2.2104E−01 | 4.4967E−01 |
| S2 | −1.0280E−01 | 3.9937E−01 | −8.9686E−01 | 1.3334E+00 | −1.2484E+00 |
| S3 | −1.7524E−01 | 5.4991E−01 | −8.1367E−01 | −4.7077E−02 | 3.4596E+00 |
| S4 | −8.9309E−02 | 2.5518E−01 | 5.9413E−02 | −2.3418E+00 | 8.9686E+00 |
| S5 | −9.6488E−02 | −3.3644E−02 | 5.7700E−01 | −5.2433E+00 | 2.2608E+01 |
| S6 | −1.0716E−01 | −2.0821E−01 | 1.3791E+00 | −5.5279E+00 | 1.2977E+01 |
| S7 | −2.2461E−01 | 1.0500E−01 | −3.4855E−01 | 1.3848E+00 | −3.4560E+00 |

TABLE 26-continued

| | | | | |
|---|---|---|---|---|
| S8 | −2.1780E−01 | 1.3634E−01 | −3.3216E−01 | 9.4166E−01 | −1.6145E+00 |
| S9 | −6.3400E−02 | 9.4292E−03 | −2.7775E−01 | 7.7644E−01 | −1.0527E+00 |
| S10 | −1.4931E−01 | 2.4322E−01 | −4.5315E−01 | 5.7216E−01 | −4.1812E−01 |
| S11 | −1.9266E−01 | 6.3259E−02 | 4.0951E−02 | −3.5229E−02 | 1.1734E−02 |
| S12 | −1.6418E−01 | 1.2517E−01 | −7.2438E−02 | 2.9352E−02 | −8.2509E−03 |

| surface number | A14 | A16 | A18 | A20 |
|---|---|---|---|---|
| S1 | −5.5464E−01 | 4.0796E−01 | −1.6531E−01 | 2.8067E−02 |
| S2 | 5.5786E−01 | 8.5541E−02 | −1.9999E−01 | 6.1218E−02 |
| S3 | −8.2326E+00 | 9.7238E+00 | −5.9727E+00 | 1.5233E+00 |
| S4 | −1.8849E+01 | 2.4151E+01 | −1.7818E+01 | 5.8995E+00 |
| S5 | −5.6410E+01 | 8.1941E+01 | −6.4560E+01 | 2.1408E+01 |
| S6 | −1.9193E+01 | 1.7595E+01 | −9.1288E+00 | 2.0553E+00 |
| S7 | 4.7521E+00 | −3.5100E+00 | 1.3151E+00 | −1.9991E−01 |
| S8 | 1.6248E+00 | −9.2740E−01 | 2.7756E−01 | −3.3890E−02 |
| S9 | 8.2778E−01 | −3.8948E−01 | 1.0139E−01 | −1.1125E−02 |
| S10 | 1.8003E−01 | −4.5491E−02 | 6.2660E−03 | −3.6425E−04 |
| S11 | −2.1881E−03 | 2.3960E−04 | −1.4417E−05 | 3.6770E−07 |
| S12 | 1.5562E−03 | −1.8708E−04 | 1.2970E−05 | −3.9457E−07 |

TABLE 27

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.19 | −7.16 | 26.56 | −26.41 | 2.14 | −1.74 | 3.94 | 4.69 | 3.36 |

Figure 18C:
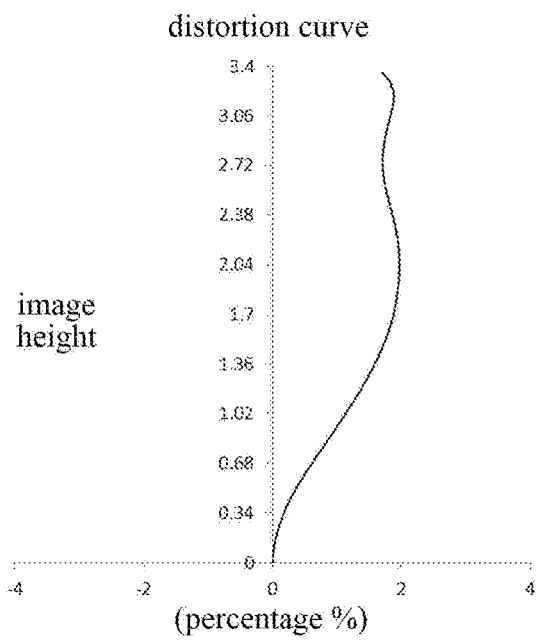
Figure 18D:
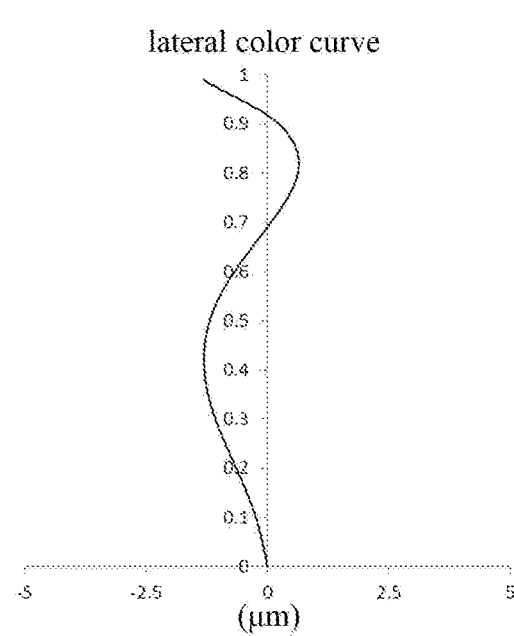

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

To sum up, Embodiments 1-9 respectively satisfy the relationships shown in Table 28 below.

The present disclosure further provides an imaging device having a photosensitive element which may be a photosensitive charge-coupled device (CCD) or complementary metal-oxide semiconductor (CMOS) element. The imaging device may be an independent camera device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical

TABLE 28

| | Embodiment | | | | | | | | |
|---|---|---|---|---|---|---|---|---|---|
| Conditional Expression | 1 | 2 | 3 | 4 | 5 | 6 | 7 | 8 | 9 |
| f/EPD | 1.79 | 1.69 | 1.79 | 1.78 | 1.80 | 1.79 | 1.78 | 1.80 | 1.79 |
| TTL/ImgH | 1.39 | 1.40 | 1.40 | 1.40 | 1.40 | 1.40 | 1.40 | 1.40 | 1.40 |
| f/f4 | −0.01 | −0.18 | −0.19 | −0.16 | −0.14 | −0.15 | −0.14 | −0.15 | −0.15 |
| f1/f | 0.90 | 0.82 | 0.81 | 0.79 | 0.81 | 0.81 | 0.81 | 0.80 | 0.81 |
| f2/f | −2.02 | −1.94 | −2.06 | −1.80 | −1.77 | −1.77 | −1.78 | −1.76 | −1.82 |
| T12 (mm) | 0.17 | 0.07 | 0.03 | 0.03 | 0.05 | 0.05 | 0.05 | 0.05 | 0.05 |
| CT5 (mm) | 0.66 | 0.72 | 0.68 | 0.66 | 0.66 | 0.66 | 0.66 | 0.67 | 0.68 |
| f/R2 | 0.62 | 0.35 | 0.29 | 0.22 | 0.30 | 0.30 | 0.30 | 0.30 | 0.33 |
| f3/|R6| | 1.57 | 1.40 | 1.88 | 1.85 | 0.62 | 0.73 | 0.64 | 0.50 | 0.32 |
| (R10 + R9)/(R10 − R9) | −1.00 | −0.88 | −0.85 | −0.92 | −1.00 | −1.00 | −1.00 | −0.99 | −0.99 |
| R12/R11 | −0.55 | −0.96 | −0.45 | −0.50 | −0.47 | −0.47 | −0.47 | −0.44 | −0.41 |
| (R6 + R5)/(R6 − R5) | 2.74 | 2.52 | −1.05 | −1.02 | 0.33 | 0.21 | 0.30 | 0.45 | 0.65 |
| TTL (mm) | 4.69 | 4.72 | 4.69 | 4.69 | 4.69 | 4.70 | 4.69 | 4.69 | 4.69 |

What is claimed is:

1. An optical imaging lens assembly comprising a first lens, a second lens, a third lens, a fourth lens, a fifth lens, and a sixth lens, sequentially from an object side to an image side along an optical axis, wherein each of the first lens and the fifth lens has a positive refractive power;

each of the second lens, the third lens, and the fourth lens has a positive refractive power or a negative refractive power;

an object-side surface of the first lens and an image-side surface of the fifth lens are convex surfaces;

an image-side surface of the second lens, an object-side surface of the sixth lens, and an image-side surface of the sixth lens are concave surfaces;

an effective focal length f3 of the third lens and a radius of curvature R6 of an image-side surface of the third lens satisfy: $0<f3/|R6|<2$; an axial distance TTL from the object-side surface of the first lens to an image plane of the optical imaging lens assembly satisfies: TTL<4.8 mm; and an image-side surface of the first lens is a concave surface, and a total effective focal length f of the optical imaging lens assembly and a radius of curvature R2 of the image-side surface of the first lens satisfy: $0.3<f/R2<0.35$.

2. The optical imaging lens assembly according to claim 1, wherein an effective focal length f1 of the first lens and the total effective focal length f of the optical imaging lens assembly satisfy: $0.7<f1/f<1$.

3. The optical imaging lens assembly according to claim 1, wherein the second lens has a negative refractive power, and an effective focal length f2 of the second lens and the total effective focal length f of the optical imaging lens assembly satisfy: $-2.1<f2/f<-1.7$.

4. The optical imaging lens assembly according to claim 1, wherein the total effective focal length f of the optical imaging lens assembly and an entrance pupil diameter EPD of the optical imaging lens assembly satisfy: $f/EPD \leq 1.8$.

5. The optical imaging lens assembly according to claim 1, wherein the fourth lens has a negative refractive power, and an effective focal length f4 of the fourth lens and the total effective focal length f of the optical imaging lens assembly satisfy: $-0.25<f/f4<0$.

6. The optical imaging lens assembly according to claim 1, wherein the axial distance TTL from the object-side surface of the first lens to the image plane of the optical imaging lens assembly and half of a diagonal length ImgH of an effective pixel area on the image plane of the optical imaging lens assembly satisfy: TTL/ImgH<1.5.

7. The optical imaging lens assembly according to claim 6, wherein a spacing distance T12 between the first lens and the second lens on the optical axis satisfies: 0 mm<T12<0.2 mm.

8. The optical imaging lens assembly according to claim 6, wherein a center thickness CT5 of the fifth lens on the optical axis satisfies: 0.6 mm<CT5<0.8 mm.

9. The optical imaging lens assembly according to claim 1, wherein a radius of curvature R5 of an object-side surface of the third lens and the radius of curvature R6 of the image-side surface of the third lens satisfy: $-1.1<(R6+R5)/(R6-R5)<3$.

10. The optical imaging lens assembly according to claim 1, wherein a radius of curvature R9 of an object-side surface of the fifth lens and a radius of curvature R10 of the image-side surface of the fifth lens satisfy: $-1.5<(R10+R9)/(R10-R9)<0$.

11. The optical imaging lens assembly according to claim 1, wherein a radius of curvature R11 of the object-side surface of the sixth lens and a radius of curvature R12 of the image-side surface of the sixth lens satisfy: $-1<R12/R11 \leq -0.4$.

12. An optical imaging lens assembly comprising a first lens, a second lens, a third lens, a fourth lens, a fifth lens, and a sixth lens, sequentially from an object side to an image side along an optical axis, wherein the first lens has a positive refractive power, and an object-side surface of the first lens is a convex surface;

the second lens has a negative refractive power, and an image-side surface of the second lens is a concave surface;

the third lens has a positive refractive power;

the fourth lens has a negative refractive power;

the fifth lens has a positive refractive power, and at least one of an object-side surface of the fifth lens or an image-side surface of the fifth lens is a convex surface;

the sixth lens has a negative refractive power, and an object-side surface and an image-side surface of the sixth lens are concave surfaces;

a radius of curvature R5 of an object-side surface of the third lens and a radius of curvature R6 of an image-side surface of the third lens satisfy: $-1.1<(R6+R5)/(R6-R5)<3$; a radius of curvature R11 of the object-side surface of the sixth lens and a radius of curvature R12 of the image-side surface of the sixth lens satisfy: $-0.55<R12/R11 \leq -0.4$; and an image-side surface of the first lens is a concave surface, and a total effective focal length f of the optical imaging lens assembly and a radius of curvature R2 of the image-side surface of the first lens satisfy: $0.2<f/R2 \leq 0.35$.

13. The optical imaging lens assembly according to claim 12, wherein the total effective focal length f of the optical imaging lens assembly and an entrance pupil diameter EPD of the optical imaging lens assembly satisfy: $f/EPD \leq 1.8$.

14. The optical imaging lens assembly according to claim 12, wherein an effective focal length f1 of the first lens and the total effective focal length f of the optical imaging lens assembly satisfy: $0.7<f1/f<1$.

15. The optical imaging lens assembly according to claim 12, wherein a spacing distance T12 between the first lens and the second lens on the optical axis satisfies: 0 mm<T12<0.2 mm.

16. The optical imaging lens assembly according to claim 12, wherein an effective focal length f3 of the third lens and the radius of curvature R6 of the image-side surface of the third lens satisfy: $0<f3/|R6|<2$.

17. The optical imaging lens assembly according to claim 12, wherein an effective focal length f4 of the fourth lens and the total effective focal length f of the optical imaging lens assembly satisfy: $-0.25<f/f4<0$.

18. The optical imaging lens assembly according to claim 12, wherein a center thickness CT5 of the fifth lens on the optical axis satisfies: 0.6 mm<CT5<0.8 mm.

* * * * *